United States Patent [19]

Brandstaetter et al.

[11] 3,944,985
[45] Mar. 16, 1976

[54] WORKSPACE ADDRESSING SYSTEM

[75] Inventors: David Peter Brandstaetter; James Marian Harris, both of Houston, Tex.

[73] Assignee: Texas Instruments Incorporated, Dallas, Tex.

[22] Filed: Oct. 19, 1973

[21] Appl. No.: 408,150

[52] U.S. Cl. .............................................. 340/172.5
[51] Int. Cl.² ............................................ G06F 9/06
[58] Field of Search ................................... 340/172.5

[56] References Cited
UNITED STATES PATENTS

| | | | |
|---|---|---|---|
| 3,643,229 | 2/1972 | Stuebe et al. | 340/172.5 |
| 3,740,722 | 6/1973 | Greenberg et al. | 340/172.5 |
| 3,774,163 | 11/1973 | Recoque | 340/172.5 |

*Primary Examiner*—Joseph M. Thesz, Jr.
*Attorney, Agent, or Firm*—Hal Levine; René E. Grossman; Leo N. Heiting

[57] ABSTRACT

The invention relates to a computer in which control means provide for high speed context switching. In a more specific aspect, the invention involves an arithmetic unit in which a workspace pointer register and control means operable on an interrupt store the contents of the workspace pointer in an element of a workspace in memory designated by the interrupt program and store in the workspace pointer register the address of the first element of the interrupt program workspace.

A first register stores the address of a first element of a set of dedicated workspace elements in main memory.

A second register stores the memory address of a current instruction of a problem program.

A third register maintains current the status of execution of the problem program of which said instruction forms a part; and Workspace for the problem program is the set of workspace elements referenced by the contents of the first register, and upon occurrence of an interrupt, a new workspace is utilized to store the contents of the registers for the problem program permitting return to the problem program by shifting to the registers the contents stored in memory.

3 Claims, 9 Drawing Figures

WORKSPACE ADDRESSING SYSTEM

This invention relates to a general purpose digital computer and more particularly to structure providing flexibility in designating and utilizing workspaces in the main memory in the computer.

In prior computer systems, a main memory generally is employed for storage of instructions and data. In connection therewith, a register file normally has been provided for use as workspace and in general involved a transfer between the register file and memory of data and instructions.

In more recent systems such as represented by the computer manufactured and sold by Texas Instruments Incorporated of Dallas, Texas, and identified as Model 960-A Computer, provision has been made for addressing workspace as memory or as a register file. In that system, a counterpart of the register file is dedicated and fixed in memory. This imposes a measure of constraints on operation of the systems because all of the programs that use such workspace normally have to share the register file.

The present invention facilitates elimination of the constraints that are inherent in the systems of the above type in that contents of a workspace register designate the address of workspace in memory. Means are provided wherein the location of workspace is selectable by a programmer. Several such selected workspaces can be specified by the programmer and linked together for inter-program communication. Means are provided to shift the computer operation from one program to another at high speed with means to store the necessary information to shift back or return to an interrupted program at the point at which an interrupt occurred.

In Volume 2 of the Maintenance Manual for Texas Instruments 960-A Computer, FIGS. 3—4 illustrate an arithmetic structure wherein the location of a workspace in main memory is generated in a multiplexer by a 16 bit preset input and a register address. This register address has four bits that are available to be used to select one of 16 elements comprising the workspace. The bit number 8 in the preset input and the four bits in the R register address are employed so that the address generated selects an appropriate register in a fixed register file as the desired workspace element.

In accordance with the present invention, a workspace pointer register is provided in which the address of the first element of any selected set of memory locations can be loaded thereby to designate a workspace location in memory. In such operation, the set of elements thus designated is utilized in the execution of a problem program.

In accordance with the present invention, means are provided for high speed context switching, i.e., switching from one program or routine to another in the middle of the execution of a problem program. Means responsive to an interrupt stores the current contents of the workspace pointer register in a new workspace for return to the problem program when the program causing the interrupt is completed and provides sequencing means to load the address of the first element of the new workspace into the workspace pointer register. Upon return, the sequencer reloads the workspace register with the pointer address stored in memory.

More particularly, in accordance with the invention, a high speed context switching computer is provided in which a multi function arithmetic unit has two input buses with a first and second multiplexer connected to the input buses of the arithmetic unit. A workspace pointer register is connected to one input of one of the multiplexers and the computer is provided with means to utilize a set of memory elements as first workspace for a current problem program with the address of the first of the elements corresponding to the contents of the workspace register. Control means is operable upon occurrence of an interrupt to load the workspace register with an address of the first element of a second workspace in memory for use by the interrupt program and for storing in a predetermined element of the second workspace the address of the first element of the first workspace. The program counter register is connected to one of the multiplexers to maintain the address of the current instruction in the problem program. The control means stores the contents of the program counter in a predetermined element of the second workspace upon occurrence of an interrupt.

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIGURE 1

The computer described herein represents a combination of elements well suited for environments that require a large number of program context changes at high speed. Very rapid context switching results directly from use of a special register for holding the current workspace address. An efficient memory to memory architectural structure employing two address instructions, standard multiply and divide hardware plus standard priority vectored interrupts is provided. Further, it provides standard features which allow user substitution of hardware modules for certain software routines. Bit, byte and word addressing may be utilized. Single, double and triple word instructions are included.

Figure 1:
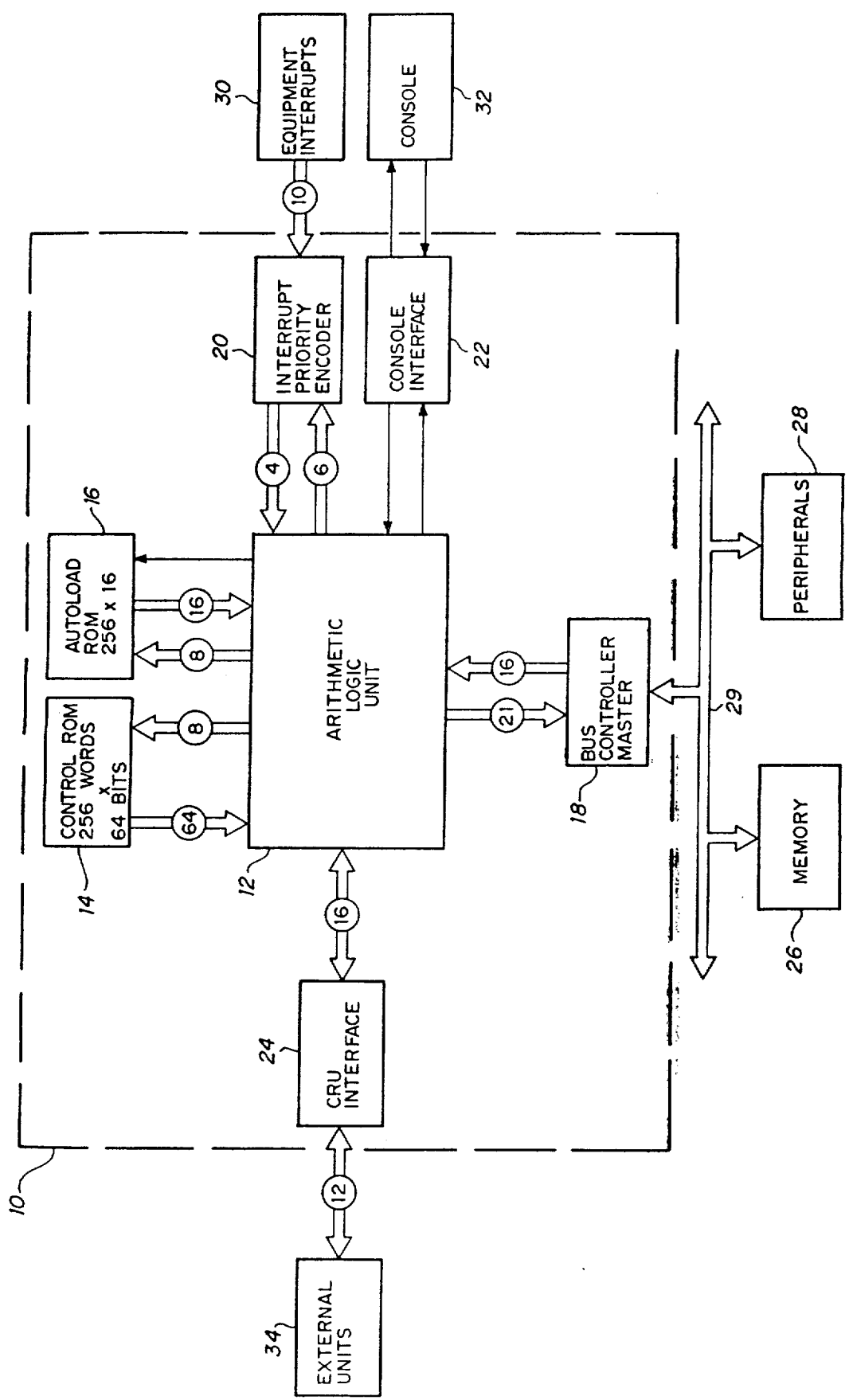
FIG. 1 is a block diagram providing an overview of a computer employing the present invention.

The basic structure of the system is illustrated in FIG. 1 wherein a central processing unit (CPU) 10 includes an arithmetic unit (AU) 12 and a control ROM 14 which in one embodiment comprises 256 words of 64 bits each. An automatic load ROM 16 is also connected to the arithmetic unit. A communication bus controller master 18 provides for interchange of data and instruction with outside memory by way of a bus 29. An interrupt priority encoder 20, a console interface 22 and a communication register unit (CRU) interface 24 are provided for communicating with units outside CPU 10.

The bus controller master 18 communicates with a memory 26 as well as to other peripherals 28 over bus 29. The encoder 20 receives signals from outside equipment designated by the reference character 30. In addition, the encoder 20 responds to signals from the AU 12 for generating interrupts dependent upon internal operations in the AU 12.

Interface 22 is connected for communicating with a console 32. Interface 24 is provided for communicating with external units such as unit 34. Communication by way of the master 18 is high speed communication. The communication through interface 24 is low speed communication.

The embodiment of the invention here described employs 16 bit data words and 20 bit addresses. AU 12 preferably comprises all electronics necessary to acquire and execute instructions from memory and to perform input/output operations. Special registers are provided which have specific and defined uses. Workspace elements are all located in memory and are employed in connection with use of the special registers. The special registers are three in number. They are 16 bit registers. The first is a workspace pointer hereinafter referred to as WP. The second is a program counter hereinafter referred to as PC. The third is a status register hereinafter referred to as ST. The PC and WP always contain an even address. Workspace pointer, WP, contains the address of the first of 16 consecutive memory locations that are actively used as workspace elements.

The program counter, PC, contains the address of the current instruction being executed at any given time. The status register, ST, contains the information shown in Table I as to the state of CPU 10.

TABLE I

| 0 | 1 | 2 | 3 | 4 | 5 | 6 | 7 | 11 | 12 | 15 |
|---|---|---|---|---|---|---|---|---|---|---|
| L | A | E | C | O | O | X | Reserved | | Interrupt | |
| LT | LT | Q | A | V | D | O | for MEM | | Mask | |
| GT | GT | | R | F | D | | MAP FILE | | | |
| | | | R | | | P | and inter- | | | |
| | | | Y | | P | | rupt mask | | | |
| | | | | | | | expansion | | | |

CONDITION CODE BITS

Bit 0. Bit 0 is set to a logic 1 as an indication of a Logical Greater Than condition. This comparison test is enabled during certain compare instructions. The test is also enabled to compare the result of a double or single operand instruction with zero. When any test fails, but 0 is reset.

Bit 1. Bit 1 is set to a logic 1 as an indication of an Arithmetic Greater Than condition. This comparison test is enabled during the same compare instructions as for bit 0. The test is also enabled to compare the result of a double or single operand instruction with zero. When any test fails, bit 1 is reset.

Bit 2. Bit 2 is set to a logic 1 as an indication of an Equal condition. The comparison test is enabled during the same compare and during corresponding bit instructions. The test is also enabled to compare the result of a double or single operand instruction with zero. When any test fails, bit 2 is reset.

Status bit 2 is also set when a CRU bit it tested with a test bit (TB) instruction and the CRU bit equal to a logic 1. Bit 2 is reset if the CRU bit is a logic 0.

Bit 3. Bit 3 indicates a carry out from the most significant bit position of an arithmetic operation result. Bit 3 may be loaded during add, subtract, increment, or decrement instructions. The carry indicator is also loaded with the carry out from the most significant or least significant bit position of shift operands. The carry will indicate the last incremental shift performed.

Bit 4. Bit 4 indicates Arithmetic Overflow and is reset when no overflow occurs. Bit 4 is affected during add, subtract, increment and decrement instructions. Overflow occurs when the result of an arithmetic operation cannot be correctly represented with a 16 bit signed two's complement value.

Bit 5. Bit 5 is set to indicate the parity of the last byte operand or resulting byte of a byte instruction. It is set to a logic 1 when the last byte operand contained an odd number of bits, otherwise it is reset.

Bit 6. Bit 6 is set to a logic 1 by the execution of an extended operation (XOP) instruction. It indicates that an extended operation is in progress. This bit can be reset by program control.

Bits 7 through 9. Bits 7 through 9 are made available for use in memory mapping. For the purpose of this description these bits will always contain zeros.

Bits 10 and 11. Bits 10 and 11 are available for interrupt mask expansion.

In this embodiment, bits 7–11 are all zeros.

Bits 12 through 15. Bits 12 through 15 are used to indicate the interrupt mask level. The four bit value in this field specifies that level and those of higher priority which are enabled as indicated in Table II.

TABLE II

| ST12 | ST13 | ST14 | ST15 | |
|---|---|---|---|---|
| 0 | 0 | 0 | 0 | Interrupt level zero only enabled |
| 0 | 0 | 0 | 1 | Interrupt level one and above enabled |
| 0 | 0 | 1 | 0 | Interrupt level two and above enabled |
| . | . | . | . | . |
| . | . | . | . | . |
| . | . | . | . | . |
| 1 | 1 | 1 | 0 | Interrupt level fourteen and above enabled |
| 1 | 1 | 1 | 1 | All interrupt levels enabled |

An important and significant difference in the computer of the present invention and prior systems lies in the provision of the workspace pointer WP. The program counter PC and the status register ST are used in a conventional sense. Together the WP, PC, ST registers are so employed to lend versatility in context changing operations when processing control is shifted from one program to another as may be requested or directed in response to interrupt signals, to commanded subroutine linkages or in carrying out of extended operations (XOP).

The AU 12 responds to instructions to process data in accordance with a method of utilizing a workspace at a selectable location in memory. Workspace heretofore has been provided in a single fixed register file or multiple fixed register files with system design such that context switching requires that some portion of the register file be stored and reloaded in order to achieve a context change. A corresponding length of time is required to return to a prior program context because the register file must generally be restored to prior values. Both the initial context change and the time to return to a prior program has been long compared to that involved in the present invention. The reason for improvement achieved by the present invention is that all that is necessary for a context change is to store and load the contents of three registers. Return to a prior program requires only that three registers be loaded with prior contents.

In the embodiment of the present invention, memory 26 consists of a printed circuit card which in total may store 4,096 16-bit words plus parity. Metal oxide semiconductor (MOS) integrated circuit networks preferably are employed as storage elements to provide for high speed memory operations. Such memory card additionally contains all address and data logic, control and timing logic and level converters to interface to a communication bus leading to AU 12.

The wordspace in memory 26 is configured as shown in Table III.

TABLE III

| | | |
|---|---|---|
| Data or Addresses | 0 1 2 3 4 5 6 7 8 9 10 11 | Workspace elements - may contain Data or Addresses |
| | CRU Base 12 | CRU Base |
| | Stored WP 13 | Address of Prior Program Workspace |
| | Stored PC 14 | Address of next instruction word in prior program |
| | Stored ST 15 | Status at the time WP and PC Linkage Data was Stored |

The workspace pointer WP defines the first element in the active set of workspace elements shown in Table III. Workspace elements are numbered E0 through E15 and can exist anywhere in memory 26 as a group of 16 consecutive memory work locations. The special addresses for storing linkage data in workspace shown in Table III are generated by arithmetically addressing the contents of the WP register to a partial address. The prior contents of the WP reigster are then stored at the address in memory corresponding to the resultant sum, i.e., element 13 of the workspace shown in Table III.

As seen from Table III each workspace set comprises 16 words or elements, 0–15. The first element is specified by the address in the WP. The element actually selected is specified by the sum of the address in WP and an additional component obtained from an address field in a computer instruction. This component is added to the contents of WP. Thus the 16 locations of the workspace are all directly addressable by certain computer instructions and the workspace can be moved to any location in memory by changing the value in WP. Location 11 is employed in some instructions as an address storage location. Element 12 is employed as CRU base storage for instructions that apply to the use of CRU. In context changing operation Element 13 in the new program workspace always is employed to store the address of the prior program workspace. Element 14 in the new program workspace always stores the address of the next instruction in the prior program. Element 15 in the new program workspace always stores the status of the program being executed at the time the WP and PC linkage data was stored.

FIG. 2

Figure 2:
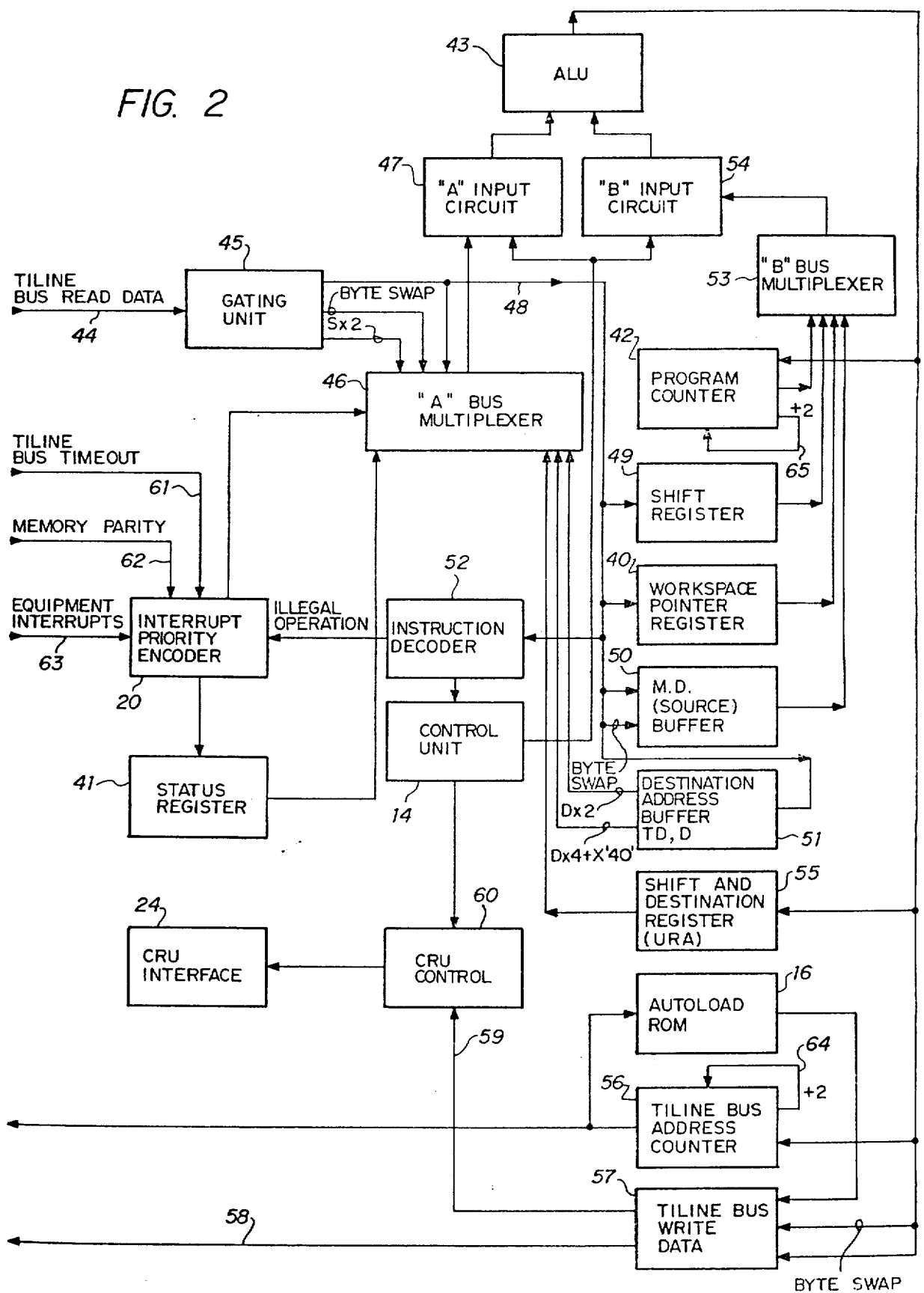
FIG. 2 is a more detailed block diagram of the computer of FIG. 1.

AU 12 FIG. 1 has been shown in greater detail in FIG. 2 in conjunction with the autoload ROM 16 and the interrupt priority encoder 20. The system includes a workspace pointer (WP) register 40, a status register (ST) 41 and a program counter (PC) 42 which operates in conjunction with an arithmetic logic unit (ALU) 43 under suitable control as to permit designation of workspace in memory 26, FIG. 1. Memory 26, FIG. 1, is connected to the AU 12 by way of a high speed bus 29 which operates to permit various master devices to exchange information with slave devices such as memory 26.

AU 12 utilizes 16 elements of memory as workspace. The starting address of such workspace in memory is contained in the register 40. As will be shown, a plurality of such workspaces can be designated in order to permit the execution of a plurality of different programs while retaining all information necessary to return to interrupted or prior programs and continue execution thereof.

Returning again to FIG. 2, data from memory is applied by way of a 16 bit bus 44 and by way of a gating unit 45 to an A-bus multiplexer 46. The output of multiplexer 46 is applied by way of an A input circuit 47 to the ALU 43. The data bus 48 also leads to a shift register 49, to workspace pointer 40, to a memory data (MD) source buffer register 50, to a destination address buffer 51 and to an instruction decoder 52.

WP register 40, PC register 42, shift register 49 and MD source buffer register 50 are each connected to a B-bus multiplexer 53 and thence, through an input circuit 54, to the B input of ALU 43. The output of ALU 43 is connected to PC register 42, shift and destination register 55, to a bus address counter 56 and to a bus write data register 57.

The autoload ROM 16 is connected to register 57. The output of write data register 57 is connected by way of a 16 bit bus 58 to the bus 29 and by way of a bus 59 to a communication register unit control 60, the output of which is applied to a communication register unit interface unit 24. An instruction decoder 52 is connected at its output to the control unit 14 which in turn is connected to the CRU control unit 60. Instruction decoder 52 is also connected to the interrupt priority encoder 20. Control unit 14 is also connected to one input of the A input circuit 47 and to the B input circuit 54. Shift and destination register 55 is connected to one input of multiplexer 46. The destination address buffer 51 is connected to two inputs to multiplexer 46. One of the inputs has two 8 bit bytes presented in normal order and the other has two 8 bit bytes in reverse order.

Interrupt priority encoder 20 is connected to the status register 41 whose output is then connected to multiplexer 46. Interrupt priority encoder 20 also is connected directly by one output to multiplexer 46. A line 61 from TILINE bus applies a time out state to the encoder 20. A line 62 applies a memory parity bit to encoder 20. Equipment interrupts are applied by way of a 10-line bus 63 to the interrupt priority encoder 20. The output of TILINE bus address counter 56 is connected to the input of autoload ROM 16 whose output is connected to one input to write data register 57. Address counter 56 is provided with an automatic increment facility as indicated by the line 64. Similarly, program counter 42 is provided with automatic increment capability as indicated by the line 65.

FIG. 3

Figure 3:
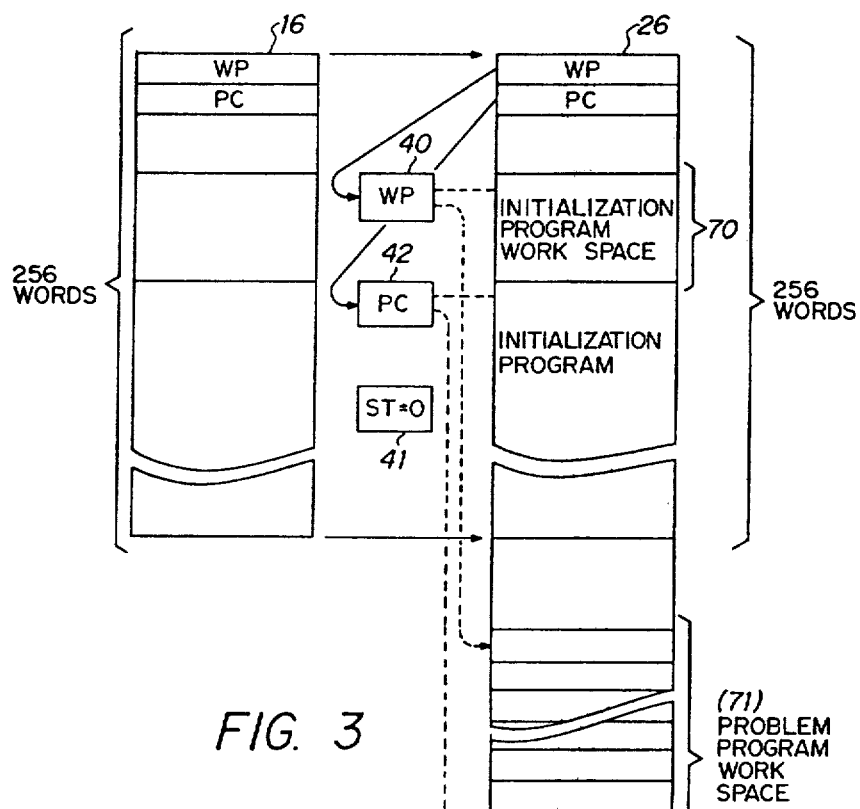
FIG. 3 illustrates operation of special registers in initial operations employing main memory as workspace.

The foregoing description provides an overview of the computer system embodying the present invention. In providing flexibility in designating and using workspace, the WP register 40, ST register 41 and PC register 42 play significant roles as illustrated in FIG. 3.

In initialization of the system, the autoload ROM 16 has stored in the first element thereof the address of the first element of the workspace to be employed in memory. The second element of ROM 16 has the address of the first instruction in the program to be first executed by the computer upon startup. The rest of the elements of ROM 16 are available for the programmer to utilize as necessary for initialization purposes. It will contain the initialization program and in the present embodiment may comprise as many as 256 16 bit words.

Upon startup, the entire contents of the ROM 16 are transferred to occupy the first 256 elements of memory 26. Thus, the WP and PC addresses are stored in the first two elements of memory 26.

After transfer of the contents of ROM 16 to memory 26 the WP address is transferred from the first element of memory 26 to WP register 40 and the contents of the second element of memory 26 to PC register 42 and execution of initialization program begins as a result of the initialization process. One or more programs to be executed by the computer may then be loaded into memory 26. Thereafter, the initialization program in memory 26 may replace the WP address in register 40 with a new WP address and will replace the PC address in register 42 with the address of the first instruction of a problem program.

In FIG. 3 the initialization program workspace is indicated as memory space 70. The problem program workspace is indicated as the memory space 71 with the problem program occupying memory space 72. The WP register 40 contains the address of the problem program workspace and the PC register 42 contains the address of the next problem program instruction. In this condition, the computer will then proceed to execute the problem program with the program counter being incremented or changed as directed for each instruction in memory and the address in the WP register 40 remaining constant or undergoing change in response to instructions contained in the program as may be directed at the initiative of the programmer preparing the problem program. ST register 41 will change contents as to maintain a current indication of the status of the execution of the problem program. The latter function of status register is well-known. ST register 41 operates in a manner corresponding in all essential respects with the operation of the status register in the Computer 960-A above identified.

FIG. 4

Figure 4:
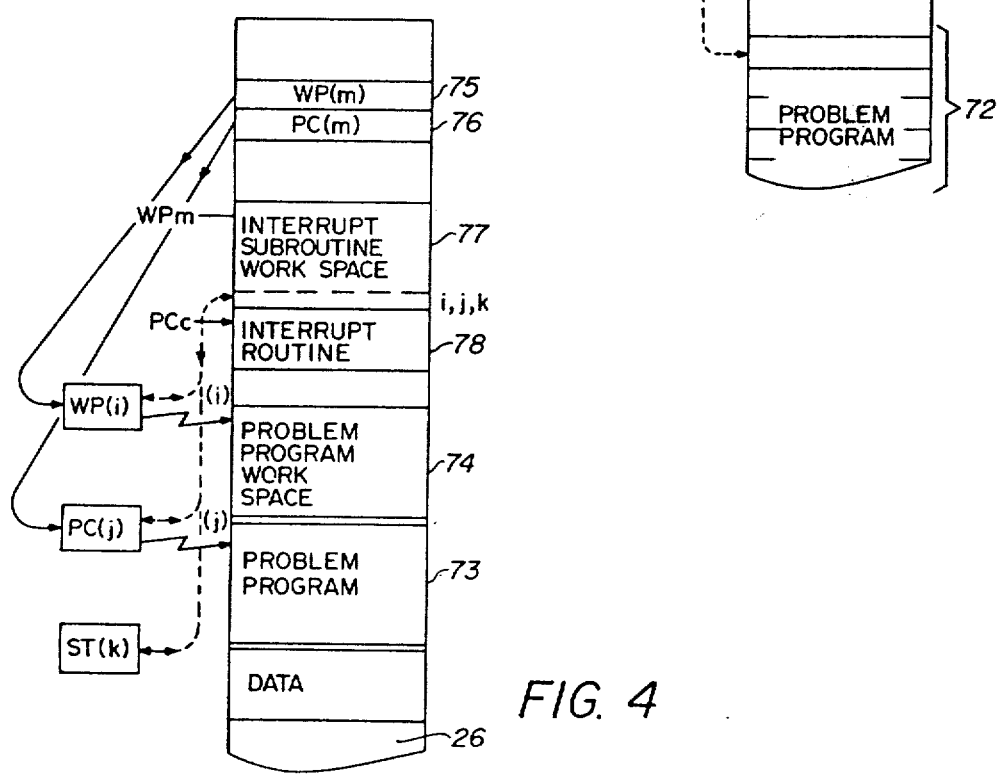
FIG. 4 illustrates the effects of an interrupt subroutine on the operation of the special registers.

In FIG. 4 the operation of the registers 40–42 of FIG. 3 is illustrated when an interrupt occurs during the execution of a given problem program. In the illustration of FIG. 4, memory 26 has stored therein a first program in memory space 73 and operates in conjunction with a problem program workspace 74.

For each interrupt that may be required in operation of the computer, the WP address of the first element of the workspace for that interrupt is stored at a programmed location in the first set of 64 locations in memory 26 by writing over any initialization program at the desired memory locations for the interrupt data, since once the initialization program has been employed in startup, the space is then available for use in other operations.

Similarly, for each interrupt, the PC address of the first instruction in the interrupt subroutine is stored in one of the elements of the first 64 elements of memory storage. In FIG. 4, element 4 is illustrated as the site for storage of the workspace pointer WP for a subroutine and element 6 is indicated as the site for storage of the program counter PC address, namely the address of the first instruction in the interrupt subroutine.

Upon occurrence of an interrupt, the computer automatically transfers from the problem program in memory space 73 operating in conjunction with workspace 74 to the interrupt subroutine 78 operating in conjunction with workspace 77. This is accomplished as follows: The contents of WP register 40 are transferred into the interrupt subroutine workspace 77 along with the contents PC of program counter 42 and the contents ST of status register 41. The contents of elements 4 and 6 are then transferred to registers 40 and 42, respectively. Concurrently, the computer changes the interrupt mask in the status register 41 to mask any lower priority interrupts so that the subroutine will run to completion unless a higher priority interrupt occurs. Thus the next instruction processed is in the interrupt subroutine 78.

Upon completion of the interrupt subroutine which is stored in memory at location space 78, the subroutine executes a return command in which event the WP address, the PC address and the contents ST of status register 41 that were stored in the interrupt subroutine workspace 77 are replaced into registers 40, 42, and 41, respectively, and the computer then return to operating on the problem program at the same point it was at upon the occurrence of the interrupt.

Figure 5:
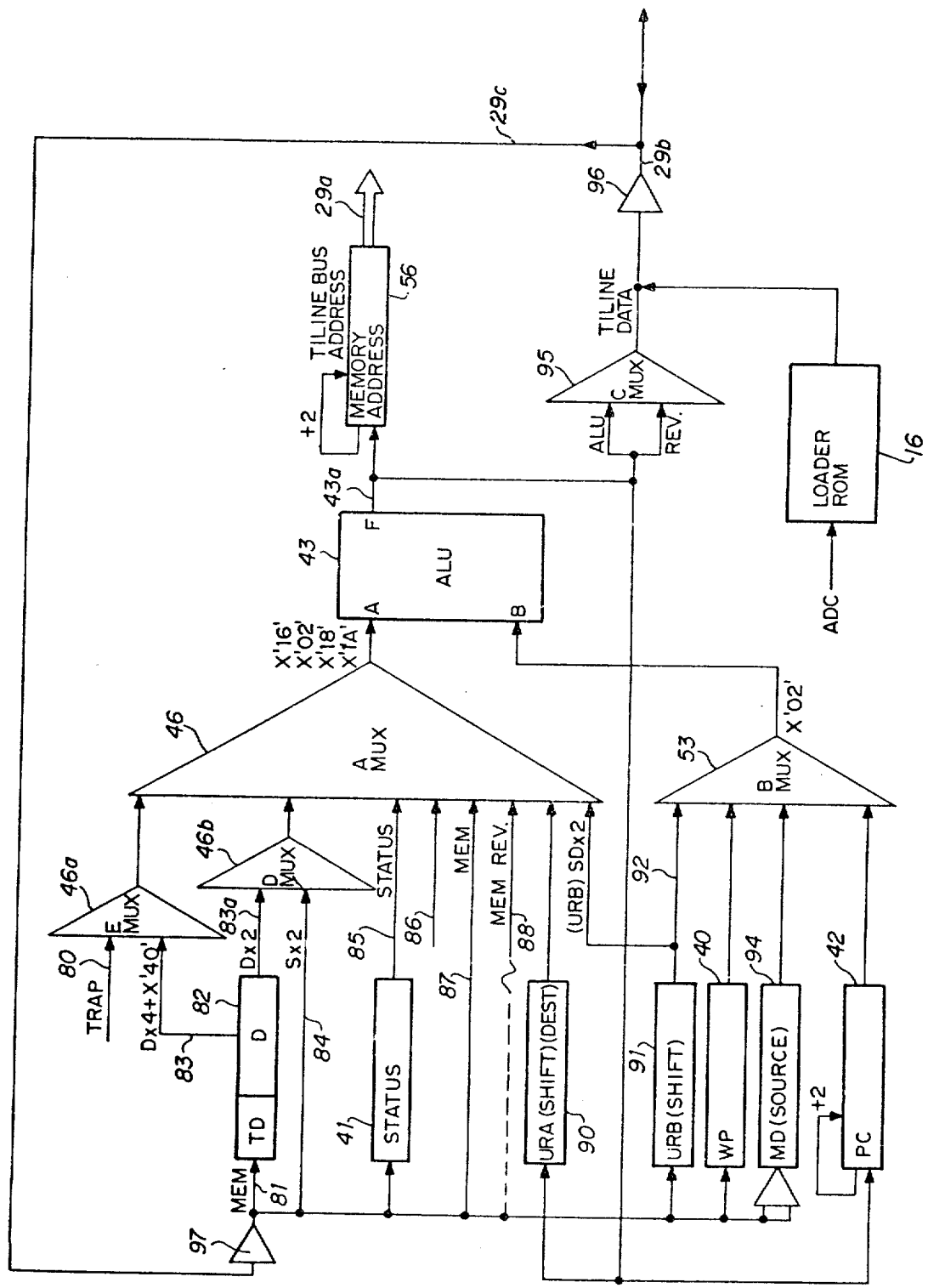
FIG. 5 illustrates portions of the central processing unit.
Figure 6:
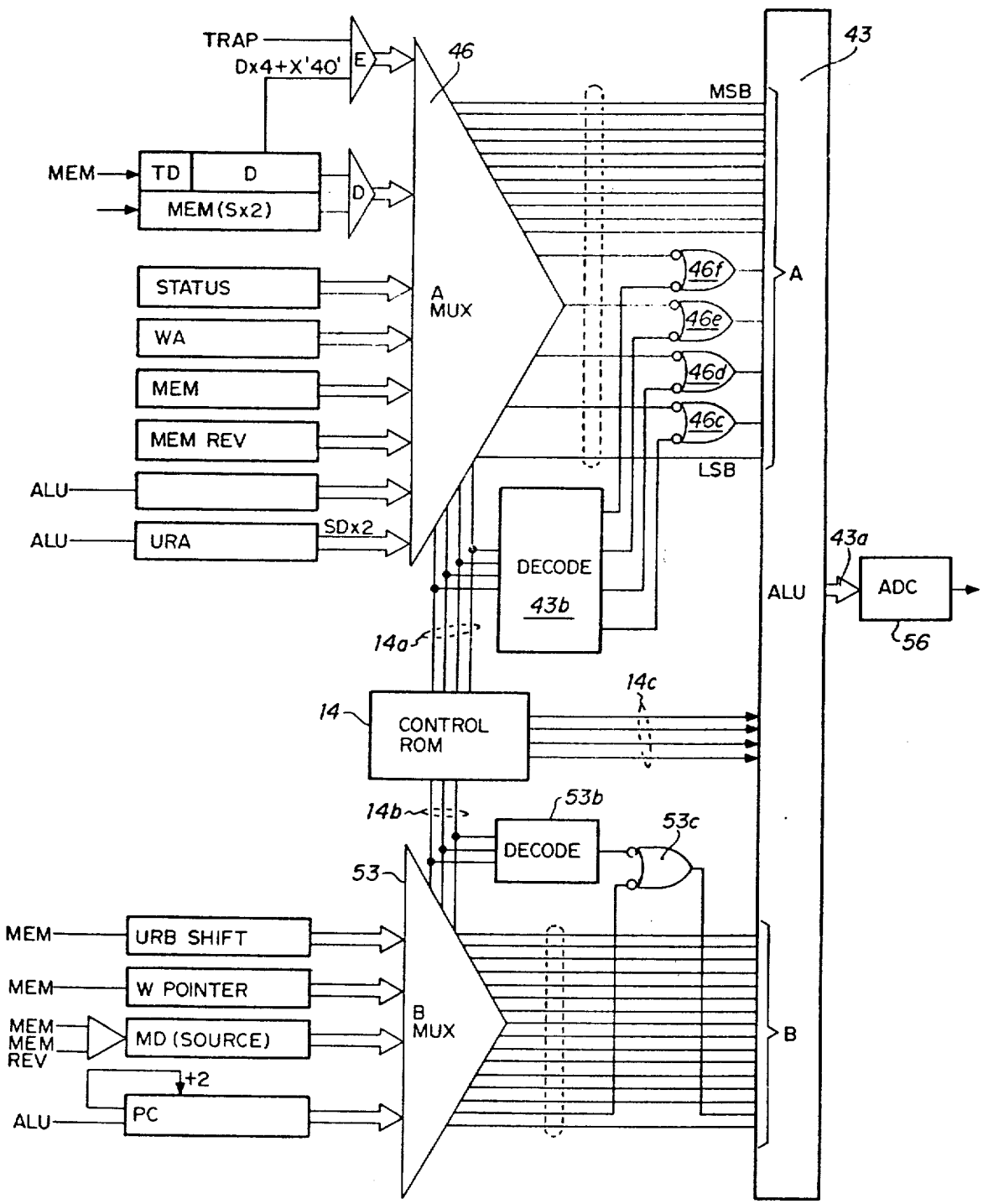
FIG. 6 is a more detailed illustration of the operations of FIG. 5.

FIGS. 5 and 6

Referring now to FIGS. 5 and 6, the ALU 43 is shown in its operative relation with respect to the A-bus multiplexer 46 and the B-bus multiplexer 53. The A-bus multiplexer 46 has eight inputs. The B-bus multiplexer 53 has four inputs. ALU 43 may comprise four LSI chips of the type described in TTL Data Book For Design Engineers by Texas Instruments Incorporated, Dallas, Texas 1973, page 381, and identified as TI Arithmetic Logic Unit/Function Generator SN74181, to form a 16 function arithmetic logic unit. Unit 43 is the same type as employed in the Computer 960-A above identified and thus will not be detailed here.

The arithmetic unit 43 has an output bus 43a which leads to an address register (ADC) 56. Line 43a also leads to the input of a multiplexer C whose output leads by way of a transmitter bank 96 to the data bus 29b leading to memory. Bus 29b is a two-way bus. Bus branch 29c leads back to a receiver band 97 to supply data to the CPU. In addition, register 56 has an output line 29a which feeds the output data to the bus 29 leading to memory.

In FIG. 5, a first input on line 80 is applied to multiplexer 46 by way of a subsidiary multiplexer 46a. The trap address input appears on bus 80 and is the address in memory at which is stored the workspace pointer value of the workspace pointer for the interrupt of highest priority, and is derived from interrupt priority encoder 20, FIG. 2.

A second input is from a memory bus at the output of receiver 97 and appears on line 81 which leads to a buffer register 82. The TD field in register 82 is the tag field for the destination address which is contained in the D field. The D field as it appears on bus 83 is shifted left two spaces and has added thereto a constant, the hexadecimal 40, in order that the address applied through the multiplexer 46a will properly identify the location in memory of the workspace pointer for the extended operation identified in the D field of register 82.

A third input on line 83a is applied from the D field shifted left by one space thereby multiplying the same by 2, to provide the word address of the destination element in workspace. This is applied by way of auxiliary multiplexer 46b.

The next input is derived by way of a memory bus 84. This input is the source address shifted one space left to provide a word address of the source element. It is applied to ALU 43 by way of the auxiliary multiplexer 46b and multiplexer 46.

The next input is the output of the status register 41 appearing on bus 85 and is applied directly to the multiplexer 46.

The next input is on bus 86 and is employed for purposes not significant to the present description.

The next input is on bus 87 which is data read from memory. Data on bus 88 is read from memory with the byte order reversed.

The next input appears on the ALU output bus 43a and is applied to a utility register 90 (URA) which serves to buffer output data from the ALU 43.

The last input to the multiplexer 46 is by way of bus 81 through utility shift register 91 (URB) which is connected to output bus 92. The latter output is applied as the first input to multiplexer 53.

The workspace pointer register 40 is connected at its input to the memory bus 81 and at its output to the multiplexer 53.

Memory bus 81 is also connected through memory data buffer register 94 to multiplexer 53. Finally the output of the ALU 43 is connected by way of bus 43a to the PC register 42 the output of which is connected to the multiplexer 53.

In the present invention, arithmetic logic unit 43 provides an output which is buffered in the memory address register 56. At any given time in the course of operation of the computer where memory is to be accessed, the memory location will be specified by a code stored in register 56.

In accordance with the present invention the workspace is specified by utilizing the programmable contents of WP register 40 which is connected to multiplexer 53 and applied to ALU 43. A particular element in the workspace is addressed by the contents of register 56, which is determined by the value of the address from WP register 40, and an address either from the bus 84 or buffer 82 which is transmitted by way of multiplexer 46b and multiplexer 46 to ALU 43. In ALU 43 the contents of register 40 and the address on bus 84 are summed so that the address of the desired element of the workspace is then specified by the contents of register 56. Likewise the address from buffer 82 can be summed with WP register 40 to obtain a workspace element address.

FIGS. 7–9

Figures 7, 9:
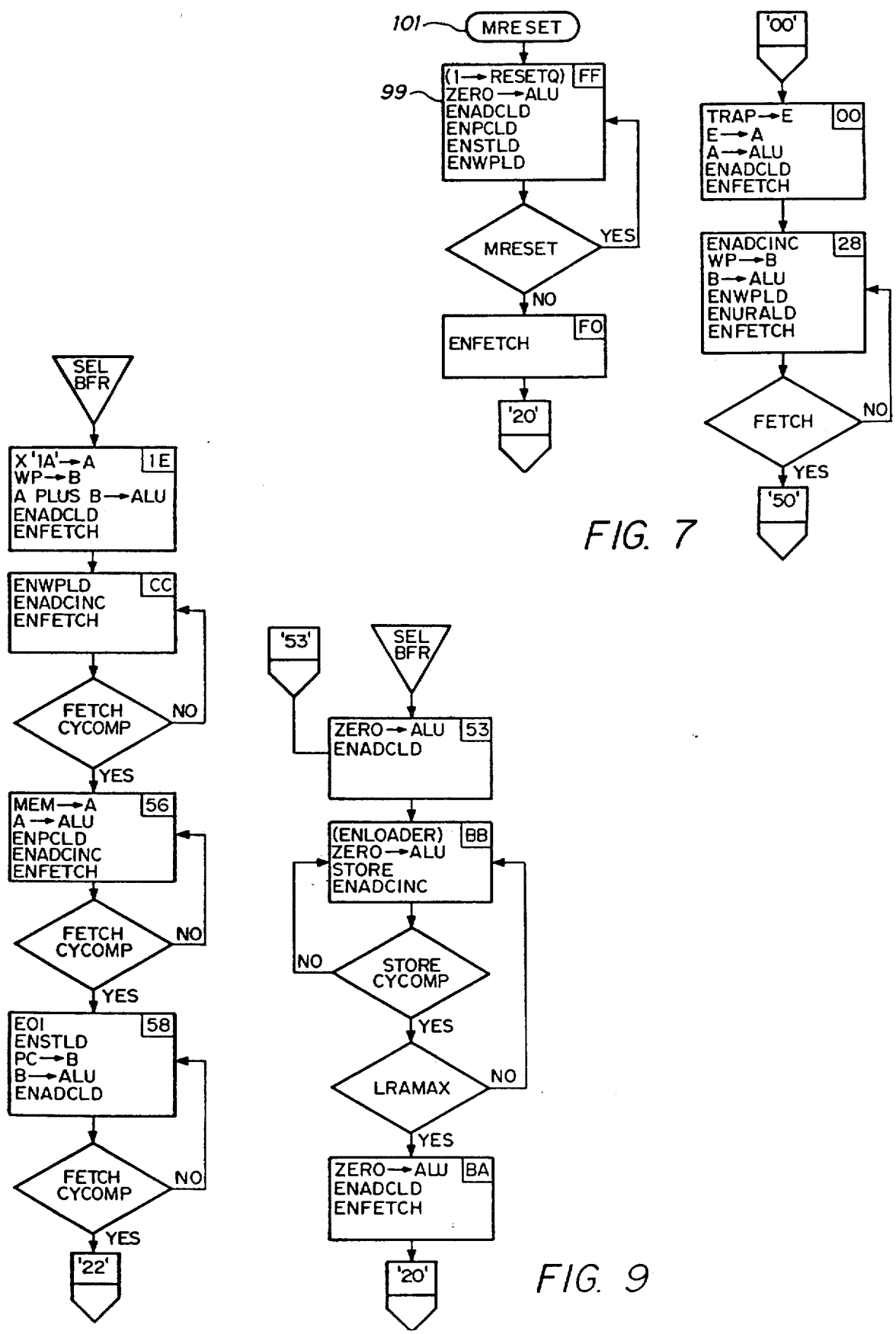
FIGS. 7, 8 and 9 are flow diagrams illustrating operations involving workspace and memory.
Figure 8:
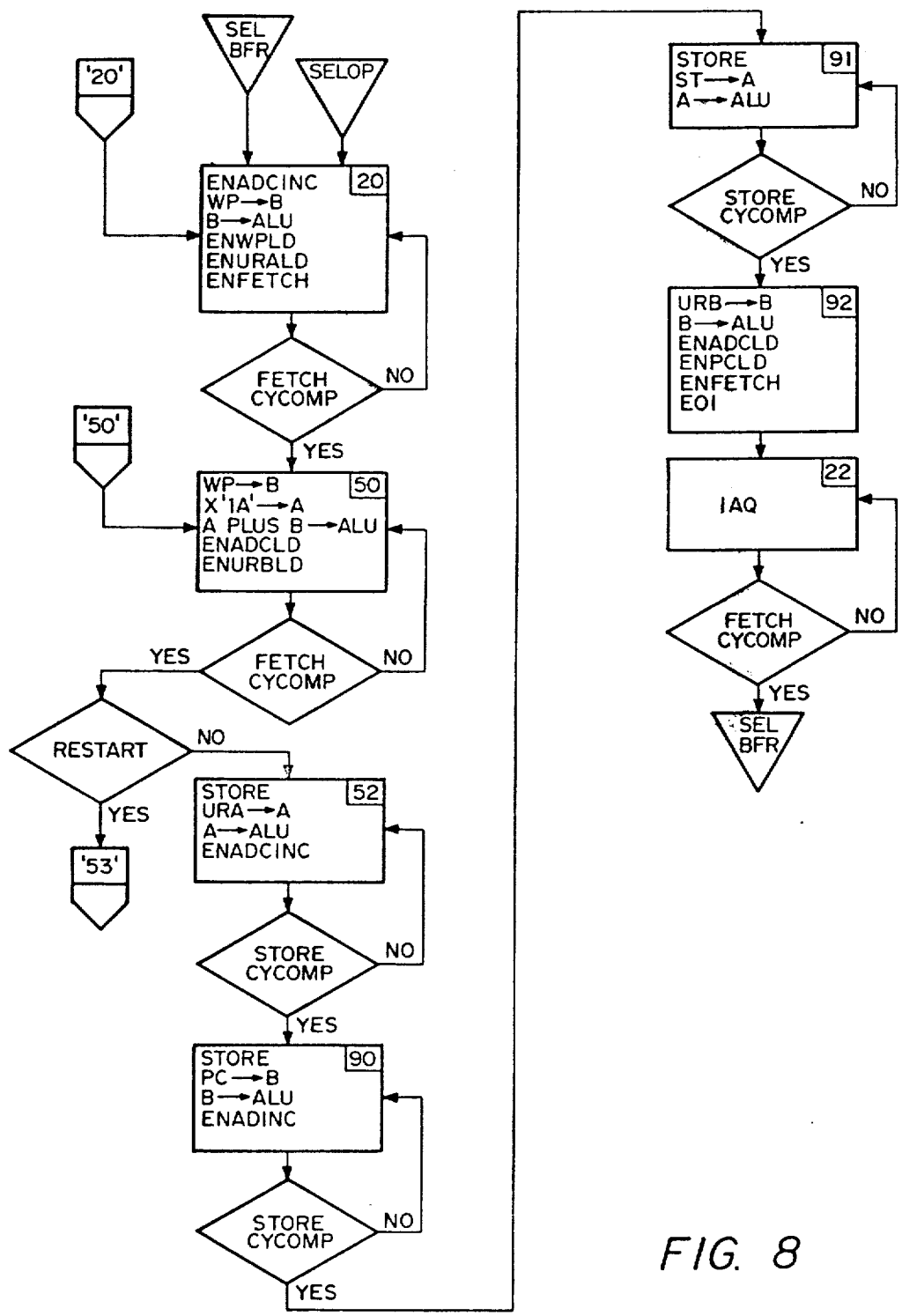

FIGS. 7, 8, and 9 comprise a flow diagram which illustrates operation such as represented by the initialization functions of FIG. 3 and the interrupt functions of FIG. 4 with the return to the problem program after an interrupt. The flow diagram of FIGS. 7, 8 and 9 should be considered in connection with the system diagrams of FIGS. 5 and 6.

In the flow diagram of FIGS. 7–9 the computer states involved are indicated by a block, such as block 99, FIG. 7. The particular state is identified by the signature in the upper right hand corner of such block. Block 99 for example represents state FF As coded in hexadecimal notation. The computer has 256 states, as will be shown, of which only 18 states are directly involved in FIGS. 7–9. In each state several steps or conditions are effective. The conditions are simultaneous and occur in response to a high speed clock in Control ROM 14.

Beginning in FIG. 7 at MRESET 101, master system reset, memory data line 81 of FIG. 5 is cleared to zero input. Proceeding into state FF, the ALU 43 is cleared for a zero output. The memory address register 56 and program counter register 42 are then loaded from the ALU for a zero input. The status register 41 and workspace pointer register 40 are loaded from memory data line 81 for a zero input. After checking to see if the reset operation is complete, the computer operation then shifts to state FO where data in memory is fetched from the address reflected by the contents of memory address register 56. As the register contains zeros, the contents of the first memory location will appear at the memory bus 81. The address of the first element of the initial workspace is contained in the first word in memory.

The computer operation then proceeds to state 20 of FIG. 8. The memory data register 56 is incremented to reflect the address of the second word in memory, which contains the address of the first program instruction to be executed. The contents of the workspace pointer register 40 are then placed at the output of the ALU. At this point in time the ALU output is zero. The workspace pointer register is then loaded from memory bus 81 of FIG. 5 to contain the address of the first element of the initial workspace. Utility register A is loaded from ALU 43 to contain zeros. Data is then fetched from the address reflected in the memory address register 56 which is the address of the second word in memory. The data, the address of the first program instruction to be executed, appears on the memory bus 81.

The computer checks to see if the fetch cycle is complete, and if so it proceeds to state 50. The address of the first element in the initial workspace is summed with the value 13 in the ALU. The address of the thirteenth element in the workspace is thus made to appear at the output of the ALU. The memory address register 56 is then loaded with the output of the ALU, and utility register B is loaded from memory to contain the address of the first instruction to be executed. The computer checks to see if the function of state 50 has been completed, and if so proceeds to state 52 if Restart is not required.

In state 52, the contents of the utility register A are made to appear at the output of the ALU. The output of ALU 43 in this case is zero, the address in memory which contains the address of the first element in the initial workspace. The ALU output, the initial contents of the workspace pointer register, is then stored in the address in memory reflected by the current contents of memory address register 56. The output is thus stored in the thirteenth workspace element of the initial workspace. The memory address register is then incremented to reflect the address of the fourteenth workspace element in the initial workspace. After checking to see if the store cycle is complete, the computer operation shifts to state 90.

In state 90, the contents of the program counter register 42 is placed at the output of the ALU 43. The ALU output, the initial content of the program counter register 42, is then stored in the fourteenth workspace element of the initial workspace. The address of the fourteenth element is contained in the memory address register 56. The memory address register is then incremented to reflect the address of the fifteenth workspace element in the initial workspace. After checking to see whether the store cycle is complete, the computer operation proceeds to state 91.

In state 91, the contents of status register 41, are made to appear at the output of ALU 43. The ALU output, the initial contents of the status register, are then stored in the address reflected by the contents of the memory address register 56. The output is thus stored in the fifteenth workspace element of the initial workspace. The computer checks to see if the store operation is complete and then proceeds to state 92.

In state 92, the contents of URB 91, the address of the first instruction to be executed, are placed at the output of the ALU. The memory address register 56 and the program counter register 42 are then loaded with the ALU output. The first instruction to be executed is then fetched from the memory address contained in the memory address register and appears at memory data bus 81. An end of instruction completes the state 92 operation. The computer proceeds with the the instruction acquisition state 22, checks to see if the fetch cycle is complete, and then continues into state 1E, FIG. 9.

At this point it will be assumed that the operation is to load the autoload ROM contents into the first 256 memory elements. In state 22, the system acquires the necessary instruction. Following completion of a fetch step, the operation shifts to state 53.

In step 1, zeros are applied to the input of the ALU. In step 2, the address register is loaded with zeros. The operation then shifts to state BB. In step 1, a loader between ROM 16 and memory 26 is enabled. The 256 words from ROM 16 are then sequentially stored in the first 256 elements of memory. This is done, as in step 4 of state BB, wherein the address register is sequentially incremented.

A store step is looped back to state BB. An inquiry as to whether or not the autoload ROM address is at a maximum (256) is also involved in a succeeding step which is looped back to state BB. When all the instructions in the autoload ROM 16 have been loaded into memory, then the operation shifts to state BA. In this state, zeros appear at the output of the ALU. Following this, the operation then shifts to state 20 wherein the operations above-described follow.

Assume now that a problem program is to be interrupted. The vectored priority interrupt system is enabled or disabled by computer instruction. Typically one instruction is to enable an interrupt of given level and those of higher priority. With the system in the operating mode and the CPU operating on a problem program, an interrupt controller is actuated and the CPU is forced to state 00, FIG. 7. In the step 1 of state 00, the trap, the address to which the program is directed in the interrupt, is applied to the input of an E multiplexer 46a FIG. 5.

In step 2, the output of the E multiplexer is applied to the A input of the ALU. In step 3, the A input appears at the output of the ALU. in step 4, the address register load is enabled and in step 5, the fetch command is issued. This serves to put the address of the new WP into the memory address register.

The operation then shifts to state 28 where in step 1 the address register is incremented. In step 2 the WP is applied to the B input terminal of the ALU, and in step 3 appears at the output of the ALU. In step 4, the WP register load is enabled to load the new WP address into register 40. In step 5 the utility register A load is enabled to save the old WP in the utility register A. In step 6 a fetch command is issued.

After the fetch is completed, the operation shifts to state 50, FIG. 8, and from there the operation proceeds to state 92 to the end of instruction as previously described.

The system then operates through the interrupt subroutine and when it comes to the end of the subroutine of the interrupt, a return signal is produced instructing the system to return to the point in the problem program at which the interrupt occurred. In state IE, step 1, the address 13 in the workspace applied to the A input terminal of the ALU appears at the output of the ALU. In step 2, the WP address is applied to the B input of the ALU. In step 3, the two inputs are then added and appear at the output of the ALU. In step 4, the address register load is enabled and a fetch is called for in step 5.

The operation then shifts to state CC which loads the WP register 40 with the old WP previously stored in memory. In step 1, WP register 40 load is enabled. In step 2, the address register is incremented to generate the address of the old PC, and in step 3 fetch is called for.

When the fetch is completed, the program shifts to state 56. In step 1, the PC address that was stored in memory is applied to the A input of the ALU in route to the PC register 42. In step 2, the A input appears at the output of the ALU. In step 3, the PC register load is enabled. In step 4, the address register is incremented to form the address of the status ST previously stored in memory. In the final step, the fetch is requested.

When the fetch is completed, the program shifts to state 58 which signals an end of instruction. In step 2, the old ST is loaded into the status register. In the next three steps, there is an update in memory of the address of the PC. More particularly, the PC appears at the B terminal of the ALU and in the next step appears at the output thereof and then is stored in the address register. A fetch is then called for. The program then proceeds to state 22 where the computer will now take up operation in the old program where the interrupt occurred.

As shown in FIG. 6, the output bus from multiplexer 46 is a 16 line bus. The output from multiplexer 53 similarly is a 16 line bus. The output from the ALU 43 similarly is a 16 line bus 43a. The control ROM 14 supplies four lines 14a to multiplexer 46 and three lines 14b to multiplexer 53. The four lines 14c lead to the ALU 43. A decoder 43b is connected to lines 14a and has outputs connected to NAND gates 46c, 46d, 46e and 46f. NAND gate 46c is connected to the next to the least significant bit line leading from multiplexer 46. NAND gates 46d, e and f are located in successively more significant bit lines leading to the A input of the ALU 43. In a similar manner, the decode unit 53b is connected at its output through a NAND gate 53c which is in the next to the least significant bit line in the bus leading from multiplexer 53.

The control unit 14 is a read only memory comprising eight LSI chips on which the word pattern is formed as set out in the following Table IV. It will be recalled that the memory comprises 256 words of 64 bits each.

The state column in Table IV tabulates numerical designation of the states in which the computer operates. For example, line 1 designates states 0–3. Line 2 designates states 4–7. The last line designates states 252–255. Column 1 of the word patterns indicates the states of the first eight bits of the output word of ROM 14 when the computer is in state 0. Column 2 of the word patterns indicates the states of the first eight bits of the output of ROM 14 when the computer is in state 1. Column 3 indicates the states of the first eight bits from ROM 14 when in state 2. Column 4 indicates the states of the first eight bits from ROM 14 in state 3.

In Table IV (2) the same information is set out for the second eight bits of the memory words. In Table IV (3) the states of the third set of eight bits are set out. There are five additional Tables IV (4)–IV (8). Thus, the state of every one of the 64 × 256 bits in the ROM 14 are signified in Table IV to provide control for each of the 256 states.

ROM 16 configured as indicated in Table IV (1–8) is employed to provide output control for the various elements of the AU 12 shown in FIGS. 5 and 6 as well as elements not shown as not pertinent to context switching operations.

As indicated in FIG. 1, the control ROM 14 is addressed by an eight bit bus with a 64 bit word being produced by the control ROM 14 for each of 256 states. The present description directs attention to the use of the control ROM 14 to implement the selective location in memory of workspace.

TABLE IV (1)

WORD PATTERN

| STATE | COL. 1<br>87654321 | COL. 2<br>87654321 | COL. 3<br>87654321 | COL. 4<br>87654321 |
|---|---|---|---|---|
| 0– 3 | HLLHLLLH | HLLHLLLL | HHHHLLLL | HHHHLLLL |
| 4– 7 | HLFLHHLL | LLHHHLLL | HHHHLLLL | HHHHLLLL |
| 8– 11 | LLHHLLLL | LLHHLLLL | LLHHLLLL | HHHHLLLL |
| 12– 15 | HHHHLLLL | LLHHLLLL | HHHHLLLL | HHHHLHLL |
| 16– 19 | HHHHLLLL | HHHHHLLL | HHHHHLLL | HLHLHHLL |
| 20– 23 | HHHHHLLL | LHHLLLLL | HHHHLLLL | HHHHHLLL |
| 24– 27 | HLHLHHLL | HLHLHHLL | LLHHLLLL | HLHLHHLL |
| 28– 31 | HHHHHLLL | HHHHLLLL | LLHHLLLL | LLHHLLLL |
| 32– 35 | HHHHLLLL | HHHHLLLL | LHLHLLLH | LLHHHHLL |
| 36– 39 | HHHHHLLL | HHHHLLLL | HHHHLLLL | LLHHLLLL |
| 40– 43 | HHHHLLLL | HHHHLLLL | LLHHHLLL | HHLHLLLL |
| 44– 47 | LLHHHLLL | HHHHLHLL | HHHHLLLL | HHHHLLLL |
| 48– 51 | HHHHLLLL | LLHHLLLL | LLHHHLLL | HHHHLLLL |
| 52– 55 | HHHLHLLL | HHHHHLLL | HHHLHLLL | HLHLHLLL |
| 56– 59 | LLHHLLHL | LLHHHLHL | HHLLLLLL | HHHHHLLL |
| 60– 63 | HHHHLLLL | HHHHLLLL | HHHHLLLL | HHHHLLLL |
| 64– 67 | HLHLHHLL | HLHLHHLL | HHHHLLLL | HHHHLLLL |
| 68– 71 | HLHLHHLL | HHHHLLLL | HLHLHHLL | HHHHLLLL |
| 72– 75 | HLHLHHLL | HHHHLLLL | HLHLHHLL | HHHHLLLL |
| 76– 79 | HLHLHHLL | HHHHLLLL | HLHLHHLL | HHHHLLLL |
| 80– 83 | LLHLLLLL | HLHLHHLL | LLHHLLLL | HHHHLLLL |
| 84– 87 | HHHHLLLL | HLHLHHLL | HHHHLLLL | HLHLHHLL |
| 88– 91 | HHHHHHLL | HLHLHHLL | HHHHLLLL | HLHLHHLL |
| 92– 95 | HHHHLHLL | HLHLHHLL | HHHHLLLL | HLHLHHLL |
| 96– 99 | LHLHLLLL | HHHHLLLL | HHHHLLLL | HHHHLLLL |
| 100– 103 | LHLHLLLL | HHHHLLLL | HHHHLLLL | HHHHLLLL |
| 104– 107 | HHHHLLLL | HHHHLLLL | HHHHLLLL | HHHHLLLL |
| 108– 111 | LLHHLLLL | HHHHLLLL | HHHHLLLL | HHHHLLLL |
| 112– 115 | LHHLLLLL | LHHLLLLL | HHHHLLLL | HHHHLLLL |
| 116– 119 | HHHHLLLL | HHHHLLLL | HHHHLLLL | HHHHLLLL |
| 120– 123 | HHHHLLLL | HHHHLLLL | HLHLHHLL | HLHLHHLL |
| 124– 127 | HLHLHHLL | HLHLHHLL | HHHHLLLL | HLHHLLLL |
| 128– 131 | HHLHLLLL | HHHHLLLL | HLHLHHLL | HHHHLLLL |
| 132– 135 | HLHLHLLL | HHHHHLLL | HLHLHHLL | HHHHLLLL |
| 136– 139 | HHHHHLLL | HLHLHLLL | HHHHLLLL | HHHHLLLL |
| 140– 143 | HHHHHLLL | HLHLHHLL | LLHHLLLL | LLHHLLLL |
| 144– 147 | HHHHHHLL | HLHHLLLL | HHHHLHLL | HHHHLLLL |
| 148– 151 | HHHLHLLL | LHHLLLLL | HLHLHHLL | LLHHLLLL |
| 152– 155 | HHHHLLLL | HHHHLLLL | HHHHLLLL | HHHHLLLL |
| 156– 159 | HLHLHLLL | HHHHHLLL | HHHHHLLL | LLHHHLLL |
| 160– 163 | LLHHHLLL | HHHHLHLL | LLHHHLLL | LLHHHLLL |
| 164– 167 | LLHHHLLL | LLHHHLLL | LLHHHLLL | LLHHHLLL |
| 168– 171 | LHLHLLLL | LLHHHLLL | LLHHLLLL | HLHLHLLL |
| 172– 175 | HHHHLLLL | HHHHLHLL | HHHHLLLL | LLHHHLLL |
| 176– 179 | HHHHHLLL | HHHHLLLL | LLHHLLLL | HLLHLLLL |
| 180– 183 | HHHHLLLL | HLHLHHLLL | HHHHLLLL | HHHHLLLL |
| 184– 187 | HHHHHLLL | HHHHHLL | HHHHLLLL | HHHHLLLL |
| 188– 191 | HLHLHLLL | HHHLPLLL | HHHHLLLL | HLHLHHLL |
| 192– 195 | HHHHLLLL | HHHHLLLL | HHHHLLLL | HHHHLLLL |
| 196– 199 | HHHHLLLL | LLLHHLLL | HLHLHHLL | HHHHLLLL |
| 200– 203 | LLLHHLLL | HHHHLLLL | HLHLHHLL | HHHHLLLL |
| 204– 207 | HHHHLLLL | LLHHHLLL | LLHHLLLL | HHHHLLLL |
| 208– 211 | HHHHLLLL | HHHHLLLL | HHHHLLLL | HHHHLLLL |
| 212– 215 | HHHHHLL | LLLHHHLL | HHHHLLLL | HHHHHLLL |
| 216– 219 | LHHLLLLL | HHHHLLLL | HHHHLLLL | LLHHHLLL |
| 220– 223 | HHHHLHLL | HHHHLHLL | HHHHLLLL | HHHHLHLL |
| 224– 227 | HHHHLLLL | LLHHLLLL | HHHHLHLL | LLHHLLLL |
| 228– 231 | HHHHLLLL | HHHHHHLL | HHHHLLLL | HHHHLLLL |
| 232– 235 | HHHHLLLL | HLHHLLLL | HHHHLLLL | LLHHHLLL |
| 236– 239 | LLHHHHL | HHHHLLLL | HHHHLLLL | HLHLHLLL |
| 240– 243 | HHHLLLLL | HHHHLLLL | HHHHLLLL | HHHHHHLL |
| 244– 247 | HHHLHLLL | HHHHHLLL | HHHHLLLL | HHHHHHLL |
| 248– 251 | HLHLHHLL | HHHHHHLL | HHHHLLLL | HHHHHLLL |
| 252– 255 | HHHHLLLL | HHHHHHLL | HHLLLHLL | HHHHLLLL |

TABLE IV (2)

| STATE | | WORD PATTERN | | | |
|---|---|---|---|---|---|
| | | COL. 1 | COL. 2 | COL. 3 | COL. 4 |
| | | 87654321 | 87654321 | 87654321 | 87654321 |
| 0- | 3 | LLFLLLLL | LLHLLLLL | LLHLLLLL | LLHLLLLL |
| 4- | 7 | LLHLLHLL | LLHLLLHH | LLHLLLLL | LLHLLLLL |
| 8- | 11 | LLHLLLLL | LLHLLLLL | LLHLLLLL | LLHLLHLL |
| 12- | 15 | LLHLLLLL | LLHLLLLL | LLHLLLLL | LLHLHHLH |
| 16- | 19 | LLHLHHLH | LLHLHLLH | LLHLHHLH | LLHLLHLL |
| 20- | 23 | LLHLHHLH | LLHLLHLL | LLHLHLLH | LLHLLLLL |
| 24- | 27 | LLHLLHLL | LLHLLHLL | LLHLLLLL | LLHLLHLL |
| 28- | 31 | LLHLHHLH | LLHLLLLL | LLHLLHLL | LLHLLLLL |
| 32- | 35 | LLHLHHLH | LLHLLLLL | LLHLLHLL | LLHLLHLL |
| 36- | 39 | LLHLLHLL | LLHLLLLL | LLHLLLLL | LLHLLLLL |
| 40- | 43 | LLHLHHLH | LLHLLLLL | LLHLHHLH | LLHLLLLL |
| 44- | 47 | LLHLLLLL | LLHLHHLH | LLHLLLLL | LLHLLLLL |
| 48- | 51 | LLHLLLLL | LLHLLLLL | LLHLHHHH | LLHLHLLH |
| 52- | 55 | LLHLLLLH | LLHLHLHL | LLHLLHLL | LLHLLHLL |
| 56- | 59 | LLHLLLHH | LLHLLLHH | LLHLLHLL | LLHLLLHH |
| 60- | 63 | LLHLLLLH | LLHLLLLL | LLHLLLLL | LLHLLLLL |
| 64- | 67 | LLHLLHLL | LLHLLHLL | LLHLLHLL | LLHLLLLL |
| 68- | 71 | LLHLLHLL | LLHLLLLL | LLHLLHLL | LLHLLLLL |
| 72- | 75 | LLHLLHLL | LLHLLLLL | LLHLLHLL | LLHLLLLL |
| 76- | 79 | LLHLLHLL | LLHLLLLL | LLHLLHLL | LLHLLLLL |
| 80- | 83 | LLHLLHLL | LLHLLHLL | LLHLLLLL | LLHLHLLH |
| 84- | 87 | LLHLLLLL | LLHLLHLL | LLHLLLLL | LLHLLHLL |
| 88- | 91 | LLHLHHLH | LLHLLHLL | LLHLLLLL | LLHLLHLL |
| 92- | 95 | LLHLHHLH | LLHLLHLL | LLHLLHLL | LLHLLHLL |
| 96- | 99 | LLHLLHLL | LLHLLLLL | HLHLLLLL | LLHLLLLL |
| 100- | 103 | LLHLLHLL | LLHLLLLL | LLHLLLLL | LLHLLLLL |
| 104- | 107 | LLHLLLLL | LLHLHHLH | LLHLLLLL | LLHLLLLL |
| 108- | 111 | LLHLLLLL | LLHLLLLL | LLHLLLLL | LLHLLLLL |
| 112- | 115 | LLHLLHLL | LLHLLHLL | LLHLLLLL | LLHLHHLH |
| 116- | 119 | LLHLLLLL | LLHLHHLH | LLHLLLLL | LLHLHHLH |
| 120- | 123 | LLHLLLLL | LLHLHHLH | LLHLLLLL | LLHLLHLL |
| 124- | 127 | LLHLLHLL | LLHLLHLL | LLHLHHLH | LLHLLLLL |
| 128- | 131 | LHHLLLLL | LLHLLLLL | LLHLLHLL | LLHLLLLL |
| 132- | 135 | LLHLLHLL | LLHLHHLH | LLHLLHLL | LLHLLLLL |
| 136- | 139 | LLHLLHLL | LLHLLHLL | LLHLLLLL | LLHLLLLL |
| 140- | 143 | LLHLHHLH | LLHLLHLL | LLHLLLLL | LLHLLLLL |
| 144- | 147 | LLHLHHLH | LLHLLLLL | LLHLHHLH | LLHLLLLL |
| 148- | 151 | LLHLLLLH | LLHLLLLL | LLHLLHLL | LLHLLLLL |
| 152- | 155 | LLHLLLLL | LLHLLLLL | LLHLLLLL | LLHLLLLL |
| 156- | 159 | LLHLLHLL | LLHLLHLL | LLHLHHLH | LLHLLLHH |
| 160- | 163 | LLHLHLHH | LLHLHHLH | LLHHHLHH | LLHHLLHH |
| 164- | 167 | LLHHLLHH | LLHHHLLL | LLHHHHLH | LLHHHHHH |
| 168- | 171 | LLHLLHLL | LLHLLLHH | LLHLLLLL | LLHLLHLL |
| 172- | 175 | LLHLLLLL | LLHLHHLH | LLHLLLLL | LLHLLLHH |
| 176- | 179 | LLHLHHLH | LLHLLLLL | LLHLLLLL | LLHLLLLL |
| 180- | 183 | LLHLLLLL | LLHLLHLL | LLHLLLLL | LLHLLLLL |
| 184- | 187 | LLHLHHLH | LLHLLHLL | LLHLHLLH | LLHLHLLH |
| 188- | 191 | LLHLLHLL | LLHLLHLL | LLHLLLLL | LLHLLHLL |
| 192- | 195 | LLHLLLLL | LLHLLLLL | LLHLLLLL | LLHLLLLL |
| 196- | 199 | LLHLLLLL | LLHLLHLL | LLHLLHLL | LLHLLLLL |
| 200- | 203 | LLHLLHLL | LLHLLLLL | LLHLLHLL | LLHLLLLL |
| 204- | 207 | LLHLLLLL | LLHLLHLL | LLHLLLLL | LLHLLLLL |
| 208- | 211 | LLHLLLLL | LLHLLLLL | LLHLLLLL | LLHLLLLL |
| 212- | 215 | LLHLHHLH | LLHLLHLL | LLHLLLLL | LLHLHHLH |
| 216- | 219 | LLHLLHLL | LLHLLLLL | LLHLLLLL | HLLLHHHH |
| 220- | 223 | LLHLHHLH | LLHLHHLH | LLHLLLLL | LLHLHHLH |
| 224- | 227 | LLHLLLLL | LLHLLLLL | LLHLHHLH | LLHLLLLL |
| 228- | 231 | LLHLLLLL | LLHLHHLH | LLHLLLLL | LLHLHHLH |
| 232- | 235 | LLHLLLLL | LLHLLLLL | LLHLLLLL | LLHLLLLL |
| 236- | 239 | LLHLLHLL | LLHLLLLL | LLHLLLLH | LLHLHHLH |
| 240- | 243 | LLHLLLLL | LLHLLLLL | LLHLLHLL | LLHLLHLL |
| 244- | 247 | LLHLLHLL | LLHLHHLH | LLHLLLLL | LLHLLHLL |
| 248- | 251 | LLHLLHLL | LLHLLHLL | LLHLHHLH | LLHLHHLH |
| 252- | 255 | LLHLLLLL | LLHLLHLL | LLHLLHLL | LLHLHLLH |

TABLE IV (3)

WORD PATTERN

| STATE | COL. 1 <br> 87654321 | COL. 2 <br> 87654321 | COL. 3 <br> 87654321 | COL. 4 <br> 87654321 |
|---|---|---|---|---|
| 0- 3 | LFLLFHLL | LFLLFHLL | LHLLFHLL | LHLLFHLL |
| 4- 7 | HHLLHHLL | LLLLHHLL | LHLLHLLL | LHLLFFFH |
| 8- 11 | LFLLHHLL | LHLLHHLL | LHLLHHLL | HHLLLLLL |
| 12- 15 | LFLLLLLL | LFLLFHLL | LHLLFFHL | LHLLLLLL |
| 16- 19 | HHLLLLLL | LHLLLLLL | LHLHLLLL | HHLLHFLL |
| 20- 23 | LHLLLLLL | HHLLHHLL | HHLLLLHH | LHLLLLLL |
| 24- 27 | FFLLFFLL | FHLLFHLL | LFLFFHLL | FHLLFHLL |
| 28- 31 | LHLLHHLL | LHLLHHLL | HHLLHHLL | LHLFHHLL |
| 32- 35 | LHHLLLLL | LHLLLLLL | HHLLLLHH | HHLLLLLL |
| 36- 39 | FFLLLLLL | LHLLHHLL | LHLLHHLL | LHLHFHLL |
| 40- 43 | LFFLLLLL | LHLLLLLL | FHLLLLLL | LHLLLLLL |
| 44- 47 | LHLHHHLL | LHLLLLLL | LHLLHHHL | LHLHFFLL |
| 48- 51 | LHLLLLLL | LHLLHHLL | LHLLLLLL | HHLLHHLL |
| 52- 55 | LLLLLLLL | FHLLLLLL | FLLLLLLL | FHLLLLLL |
| 56- 59 | LHLLLLLL | LLLLLLLL | HHLLHHLL | LHLLHHLL |
| 60- 63 | HHLLHHLL | LHLLHHLL | LHLLHHLL | LFHLHHLL |
| 64- 67 | FFLFHHLL | FFLFFHLL | LHLFFHLL | LHLHHHLL |
| 68- 71 | HHLHHHLL | LHLHHHLL | HHLFHHLL | LHLHFHLL |
| 72- 75 | HHLHHHLL | LHLHHHLL | HHLHHHLL | LHLHHHLL |
| 76- 79 | FFLFFHLL | LHLFFHLL | FHLFFHLL | LFLHFHLL |
| 80- 83 | HHLLHHHH | FHLLHHLL | LHLLFHLL | HHLLFHLL |
| 84- 87 | LHLLHHLL | HHLLHHLL | LHLLHHLL | HHLLFHLL |
| 88- 91 | LHLLFFLL | HHLLHHLL | LHLLHHLL | HHLLFHLL |
| 92- 95 | LFLLLLLL | FHLLFHLL | LHLLFHLH | HHLLFHLL |
| 96- 99 | HHLHHHLL | LHLLHHLL | LHLHHHLL | LHLLLLLL |
| 100- 103 | FHLFHHLL | LHLLHHLL | LHLLLLLL | LHLHLLLL |
| 104- 107 | LFLLFHLL | LHLLFHLL | LHLLHHLL | LHLLLLLL |
| 108- 111 | LHLLHHLL | LHLLHHLL | LHLLHHHL | LHLLFFHL |
| 112- 115 | HHLLHHLL | HHLLHHLL | LHLLHHHH | LHLLFFHH |
| 116- 119 | LFLLFFFH | LHLLFFHH | LHLLFFFH | LHLLFFHH |
| 120- 123 | LHLLHHHH | LHLLFHHH | HHLLHHLL | HHLLFHLL |
| 124- 127 | HHLLHHLL | HHLLHHLL | LHLLHHLL | LHLLFHLL |
| 128- 131 | LHLLLLLL | LHLLHHLL | HHLLHHHH | LHLLHHHH |
| 132- 135 | FFLLFFLL | LHLLLLLL | HHLLHHLL | LHLLFHLL |
| 136- 139 | HHLLHHLL | HHLLHHLL | LHLLLLLL | LHLLFFFH |
| 140- 143 | LHLLHHLL | FHLLHHLL | LHLLHHLL | LHLLHHLL |
| 144- 147 | LFLLFHLL | LHLLFHLL | LHLLFHLL | LHLLHHLL |
| 148- 151 | LLLLHHLL | LHLLLLLL | FHLLHHLL | LHLLHHLL |
| 152- 155 | LHLLHHLL | LHLLHHLL | LHHLHHLL | LHLLLLLL |
| 156- 159 | FHLLFHLL | FHLLHHLL | LHLLHHLL | LLLLLLLL |
| 160- 163 | LHLLLLLL | LHLLHHLL | HHLLLLLL | LLLLLLLL |
| 164- 167 | LHLLHHLL | HHLLLLLL | LHLLLLLL | LHLLLLLL |
| 168- 171 | FHLLFFHH | LHLLHHLL | LFLLFHLL | FHLLFHLL |
| 172- 175 | LFLLHHLL | LHLLHHLL | LHLLHLLL | LLLLFHLH |
| 176- 179 | LHLLLLLL | LHLLHHLL | LHLLHHLL | LFLLFHLL |
| 180- 183 | LFLLFHLL | HHLLHHLL | LHLHHHLL | LFLLFHLL |
| 184- 187 | LFLLFFLL | FFLLFHLL | FFLLFHLL | HHLLHHLL |
| 188- 191 | HFLLHHLL | HLLLHHLL | LHLLLLLL | HHLLFHLL |
| 192- 195 | LHLLFHLL | LHLLHHLL | LHLLHHLL | LHLLFHLL |
| 196- 199 | LFLFFFLL | FFLLFFLL | FHLLFHLL | LHLFFHLL |
| 200- 203 | HHLLHHLL | LHLLHHLL | FHLLFHLL | LHLLFHLL |
| 204- 207 | LHHLHHLL | HHLLHHLL | LHLLHHLL | LHLLLHHL |
| 208- 211 | LFLLFHLL | LFLLFHLL | LFLLFHLL | LFLLHHLL |
| 212- 215 | LHLLHHLL | HHLLHHLL | LHLLHHLL | LHLLLLLL |
| 216- 219 | FHLLHHLL | LHLLHHLL | LHLLHHHL | LHLLLLLL |
| 220- 223 | LHLLLLLL | LHLLHHLL | LHLLHHHL | LHLLLLLL |
| 224- 227 | LFLLFFLL | LFLLHHHH | LHLLFHLL | LHLLFHLL |
| 228- 231 | LHLLHHLL | LHLLHHLL | LHLLHHLL | LHLLFHLL |
| 232- 235 | LHLLHHLL | LHLLHHLL | LHLLHHLL | LFLLFHLL |
| 236- 239 | FFLLLLLL | LFLLFHLL | FHLLFHLL | LFLLFHLL |
| 240- 243 | LHLLHHLL | LHLLHHLL | HHLLHHLL | HHLLHHLL |
| 244- 247 | HLLLHHLL | LHLLHHLL | LHLLHHLL | HHLLHHLL |
| 248- 251 | FFLLFHLL | HLLLHHLL | LHLLFHLL | LHLLLLLL |
| 252- 255 | LHLLLLLL | HHLLLLLL | HHLLFHLL | FFHLFHLL |

TABLE IV (4)   WORD PATTERN

| STATE | COL. 1 | COL. 2 | COL. 3 | COL. 4 |
|---|---|---|---|---|
| | 87654321 | 87654321 | 87654321 | 87654321 |
| 0- 3 | HLHHLLLL | HLHHLLLL | HLHHHLLL | HLHHHLLL |
| 4- 7 | HLHLLLLL | HLHHHLLL | HLHHHLLL | HLHHHLLL |
| 8- 11 | HLHHLLLL | HLHHLLLL | FLHHLLLL | HLHHLLLL |
| 12- 15 | HLHHLLLL | HLHHLLLL | HHHHHLHH | HLHHHLHL |
| 16- 19 | HLHHHLLL | HLHHHLLL | HLHHHLLL | HLHLLLLL |
| 20- 23 | HLHHHLHL | HLHHLLLL | HLHHHLLL | HLHHHHLL |
| 24- 27 | HLFLLLLL | FLFLLLLL | FLHHLLLL | HLHLLLHH |
| 28- 31 | HLHHHLLL | HLHHHLLH | HLHHLLLL | HLHHLLLL |
| 32- 35 | HLHLHHLL | HLHHHLLL | HLHHLLLL | HLHHHLHH |
| 36- 39 | HLHHLLLL | HLHHHLLL | FLHHHLLL | HLHHLLLL |
| 40- 43 | HLHHHHLL | HLHHHLLL | HLHHHLHL | HLHHHLLL |
| 44- 47 | HLHHLLLL | HLHHHLHL | HHHHHLHH | HLHHHHLL |
| 48- 51 | HLHHHLLL | HLHHLLLL | FLHHHLHL | HLHHHLLL |
| 52- 55 | HLHHHLHL | HLHHHLHL | HLHHHLHH | HLHHHLHH |
| 56- 59 | HLHHHLHH | HLHHHLHH | HLHHLLLL | HLHHHLHL |
| 60- 63 | HLHHHLLL | HLHHHLHL | LLHHHLLL | HLHHHLLL |
| 64- 67 | HLHLLLLL | HLHLLLLL | HLHHHLLL | HLHHHLLL |
| 68- 71 | HLHLLLLL | HLHHHLLL | HLHLLLLL | HLHHHLLL |
| 72- 75 | HLHHLLLL | HLHHHLLL | HLHLLLLL | HLHHHLLL |
| 76- 79 | HLHLLLLL | HLHHHLLL | HLHLLLLL | HLHHHLLL |
| 80- 83 | HLHHLLLL | HLHLLLLL | HLHHHHLL | HLHHLLLH |
| 84- 87 | HLHHHLLL | HLHLLLLL | HLLHHHLL | HLHLLLLL |
| 88- 91 | HLHHLLLL | HLHHLLLL | HLHHHLLL | HLHLLLLL |
| 92- 95 | HLHHHLHL | HLHLLLLL | HHHHHLHH | HLHLLLLL |
| 96- 99 | HLHHLLLL | HLHHLLLL | HLHHHLLL | HLHHLLLL |
| 100- 103 | HLHHLLLL | HLHHLLLL | HLHHLLLL | HLHHHLLL |
| 104- 107 | HLHHLLLL | HLHHHLLL | HLHHLLLL | HLHHLLLL |
| 108- 111 | HLHHLLLL | HHHHHLLL | HHHHHHLL | HLHHHHLL |
| 112- 115 | HLHHLLLL | HLHHLLLL | HLHHHLLL | HLHHLLLL |
| 116- 119 | HLHHLLLL | HLHHLLLL | HLHHHLLL | HLHHLLLL |
| 120- 123 | HLHHHLLL | HLHHLLLL | HLHLLLLL | HLHLLLLL |
| 124- 127 | HLHLLLLL | HLHHLLLL | HLHHHLLL | HLHHHLLL |
| 128- 131 | HLHHHLLL | HLHHLLLL | HLHLLLLL | HLHHHLLL |
| 132- 135 | HLHHHLLL | HLHHLLLL | HLHLLLLL | HLHHLLLL |
| 136- 139 | HLHHLLLL | HLHHHLLL | HLHHLLLL | HLHHHLLL |
| 140- 143 | HLHHLLLL | HLHHHLLL | HLLHLLLL | HLHHHLLL |
| 144- 147 | HLHHHHLL | HLHHHLLL | HLLHLLLL | HLHHLLLL |
| 148- 151 | HLHHHLLL | HLHHHLLL | HLHLLLLL | HHHHHHLL |
| 152- 155 | HLLHHLLL | HLHHHLLL | HLHHHLLL | HLHHHLLL |
| 156- 159 | HLHHHLLL | HLHHLLLL | HLHHLLLL | HLHHHHLL |
| 160- 163 | HLHHHLHL | HLHHHLLL | HLHHHLLH | HLHHHLLH |
| 164- 167 | HLHHHLHL | HLHHHLLH | HLHHHLLH | HLHHHLLH |
| 168- 171 | HLHHLLLL | HLHHHLLL | FLHHHLLL | HLHHHLLL |
| 172- 175 | HLHHHLLL | HLHHHHLL | HLHHHLLL | HHHHHLLL |
| 176- 179 | HLHHLLLL | HHHLHLLL | HLHHHLHH | HLHHLLLL |
| 180- 183 | HLHHLLLL | HLHHLLLL | HHHHHHLL | HLHHHLLL |
| 184- 187 | HLHHLLLL | HLHHHLLL | HLHHHHLL | HLHHHHLL |
| 188- 191 | HLHHHLLL | HLHHHLLL | HHHHHHLL | HLHLLLLL |
| 192- 195 | HLHHHLLL | HLHHHLLL | HLHHHLLL | HLHHHLLL |
| 196- 199 | HLHHHLLL | LLHHLLLL | HLHLLLLL | HLHHHLLL |
| 200- 203 | LLHHLLLL | HLHHHLLL | HLHLLLLL | HLHHHLLL |
| 204- 207 | HLHHHHLL | HLHHHLLL | HLHHHHLL | HHHHHLLL |
| 208- 211 | HLHHHLLL | HLHHHLLL | HLHHHLLL | HLHHHLLL |
| 212- 215 | HLHHLLLL | HLHHLLLL | HLHLHLLL | HLHHLLLL |
| 216- 219 | HLHHLLLL | LLHHLLLL | HLHHLLLL | HLHHHLHL |
| 220- 223 | HLHHHLLL | HLHHHLLL | HHHHHLHH | HLHHHLHL |
| 224- 227 | HLHHHLLL | HLHHHLLL | HLHHHLLL | HLHHLLLL |
| 228- 231 | HLHHHLLL | HLHHHLLL | HLHHHLLL | HLHHHLLL |
| 232- 235 | HLHHHLLL | HLHHHLLL | HLHHHLLL | HLHHHLLL |
| 236- 239 | HLHHHLLL | HLHHHLLH | HLHHLLLL | HLHHLLLL |
| 240- 243 | HLHHHLLL | HLHHLLLL | HLHHLLLL | HLHHHLLL |
| 244- 247 | HLHHHLLL | HLHHLLLL | HLHHLLLL | HLHHLLLL |
| 248- 251 | HLHHHLLL | HLHHHLLL | HLHHLLLL | HLHHLLLH |
| 252- 255 | HLHHLLLL | HLHHLLLL | HLHHLLLL | HLLHLLLL |

TABLE IV (5)  WORD PATTERN

| STATE | COL. 1<br>87654321 | COL. 2<br>87654321 | COL. 3<br>87654321 | COL. 4<br>87654321 |
|---|---|---|---|---|
| 0- 3 | LLLLLLLH | LLHHLLLH | LLLLHHLH | LLHHLLLH |
| 4- 7 | LLLLLLLH | LLLLLLLH | LLLLHHLH | LLHHLLLH |
| 8- 11 | LLLLLLLH | LLLLLLLH | LLLLLLLH | LLLLLLLH |
| 12- 15 | LLLLLLLH | LLLLLLLH | HLLLHHLH | HHLLLLLH |
| 16- 19 | LLLLLLLH | LLLLLLLH | LLLLLLLH | LLLLLLLH |
| 20- 23 | LHLLLLLH | LLLLLLLH | LLLLLLLH | LLLLLLLH |
| 24- 27 | LLLLLLLH | LLLLLLLH | LLLLLLLH | LLLLLLLH |
| 28- 31 | LLLLLLLH | LLLLLLLH | LLLLLLLH | LLLLLLLH |
| 32- 35 | LLLLLLLH | LLLLLLLH | LLLLLLLH | LHLLLLLH |
| 36- 39 | LLLLLLLH | LLHHLLLH | LLLLLLLH | LLLLLLLH |
| 40- 43 | LLLLLLLH | LLLLLLLH | HHLLLLLH | LLLLLLLH |
| 44- 47 | LLLLLLLH | HHLLLLLH | HLLLLHLH | LLLLLLLH |
| 48- 51 | LLLLLLLH | LLLLLLLH | HHLLLLLH | LLLLLLLH |
| 52- 55 | HHLLLLLH | HHLLLLLH | LHLLLLLH | LHLLLLLH |
| 56- 59 | LHLLLLLH | LHLLLLLH | LLLLLLLH | LLLLLLLH |
| 60- 63 | LLLLLLLH | HHLLLLLH | LLHHLLLH | LLLLLLLH |
| 64- 67 | LLLLLLLH | LLLLLLLH | LLLLLLLH | LLLLLLLH |
| 68- 71 | LLLLLLLH | LLHHLLLH | LLLLLLLH | LLLLLLLH |
| 72- 75 | LLLLLLLH | LLLLLLLH | LLLLLLLH | LLLLLLLH |
| 76- 79 | LLLLLLLH | LLLLLLLH | LLLLLLLH | LLLLLLLH |
| 80- 83 | LLLLLLLH | LLLLLLLH | LLLLLLLH | LLLLLLLH |
| 84- 87 | LLLLLLLH | LLLLLLLH | LLLLLLLH | LLLLLLLH |
| 88- 91 | LHLLLLLH | LLLLLLLH | LLLLLLLH | LLLLLLLH |
| 92- 95 | HHLLLLLH | LLLLLLLH | HLLLLLLH | LLLLLLLH |
| 96- 99 | LLLLLLLH | LLLLLLLH | LLHHLLLH | LLLLLLLH |
| 100- 103 | LLLLLLLH | LLLLLLLH | LLLLLLLH | LLLLLLLH |
| 104- 107 | LLLLLLLH | LLHHLLLH | LLLLLLLH | LLLLLLLH |
| 108- 111 | LLHHLLLH | LLHHLLLH | LLHHLHLH | LLHHLHLH |
| 112- 115 | LLLLLLLH | LLLLLLLH | LLLLLLLH | LLLLLLLH |
| 116- 119 | LLLLLLLH | LLLLLLLH | LLHHLLLH | LLHHLLLH |
| 120- 123 | LLLLLLLH | LLLLLLLH | LLLLLLLH | LLLLLLLH |
| 124- 127 | LLLLLLLH | LLLLLLLH | LLLLLLLH | LLLLLLLH |
| 128- 131 | LLLLLLLH | LLLLLLLH | LLLLLLLH | LLLLLLLH |
| 132- 135 | LLLLLLLH | LLLLLLLH | LLLLLLLH | LLLLLLLH |
| 136- 139 | LLLLLLLH | LLLLLLLH | LLLLLLLH | LLLLLLLH |
| 140- 143 | LLLLLLLH | LLLLLLLH | LLLLLLLH | LLLLLLLH |
| 144- 147 | LLLLLLLH | HHLLLLLH | LLLLLLLH | LLLLLLLH |
| 148- 151 | LLLLLLLH | LLLLLLLH | LLLLLLLH | HLLLLLLH |
| 152- 155 | LLHHLLLH | LHHHLLLH | LLHHLLLH | LLHHLLLH |
| 156- 159 | LLLLLLLH | LLLLLLLH | LLLLLLLH | HLLLLLLH |
| 160- 163 | HHLLLLLH | LLLLLLLH | LHLLLLLH | HLLLLLLH |
| 164- 167 | LLLLLLLH | HLLLLLLH | LHLLLLLH | LHLLLLLH |
| 168- 171 | LLLLLLLH | LLLLLLLH | LLLLLLLH | LLLLLLLH |
| 172- 175 | LLLLLLLH | LLLLLLLH | LLLLLLLH | LLLLLLLH |
| 176- 179 | LLLLLLLH | LLHHLLLH | HHLLLLLH | LLLLLLLH |
| 180- 183 | LLLLLLLH | LLLLLLLH | LLLLLLLH | LLLLLLLH |
| 184- 187 | LLLLLLLH | LLLLLLLH | LLLLLLLH | LLLLLLLH |
| 188- 191 | LLHHLLLH | LLHHLLLH | LLHHHLHH | LLHHLLLH |
| 192- 195 | LLHHLLLH | HLHHLLLH | LLLLLLLH | LLLLLLLH |
| 196- 199 | LLLLLLLH | LLLLLLLH | LLLHHHHH | LLLLLLLH |
| 200- 203 | LLLLLLLH | LLLLLLLH | LLLLLLLH | LLLLLLLH |
| 204- 207 | LLLLLLLH | LLLLLLLH | LLLLLLLH | LLLLHLLH |
| 208- 211 | LLLLLLLH | LLLLLLLH | LLLLLLLH | LLLLLLLH |
| 212- 215 | LLLLLLLH | LLLLLLLH | LLLLLLLH | LLLLLLLH |
| 216- 219 | LLLLLLLH | LLLLLLLH | LLHHLHHH | LHHHLLLH |
| 220- 223 | LLHHLLLH | LLHHLLLH | HLLLLLLH | HHLLLLLH |
| 224- 227 | LLHHLLLH | LLHHLLLH | LLHHLLLH | LLHHLLLH |
| 228- 231 | LLHHLLLH | LLHHLLLH | LLHHLLLH | LLHHLLLH |
| 232- 235 | LLHHLLLH | LLHHLLLH | LLHHLLLH | LLHHLLLH |
| 236- 239 | LLHHLLLH | LLHHLLLH | LLHHLLLH | LLHHLLLH |
| 240- 243 | LLLLLLLH | LLLLLLLH | LLLLLLLH | LLLLLLLH |
| 244- 247 | LLLLLLLH | LLLLLLLH | LLLLLLLH | LLLLLLLH |
| 248- 251 | LLLLLLLH | LLLLLLLH | LLLLLLLH | HHLLLLLH |
| 252- 255 | LLLLLLLH | LLLLLLLH | LLHHLLLH | LHLLLLLH |

TABLE IV (6)　　　　　　WORD PATTERN

| STATE | | COL. 1 | COL. 2 | COL. 3 | COL. 4 |
|---|---|---|---|---|---|
| | | 87654321 | 87654321 | 87654321 | 87654321 |
| 0- | 3 | HHLLLLLH | HHLLLLLH | LHLLHLLL | LHLLFLHH |
| 4- | 7 | FFLPLLFH | LFLLLFLH | LFLLLFHL | LHLLLLLH |
| 8- | 11 | LHHLLHLH | LHHLLHLH | LHHLLHLH | LFHLLLLH |
| 12- | 15 | LHHLLLLH | LHHLLHLH | LHLLLLHL | LLLLLLLH |
| 16- | 19 | LFHLLLLH | LFHLLLLH | LHLLLLLH | HHLLLLLH |
| 20- | 23 | LFLLLLLH | HHLLLLLH | LHLFFHLH | HHLFFHLH |
| 24- | 27 | HHLLLLLH | LHLLHLLH | LHLLLLLH | HHLHLLHH |
| 28- | 31 | LLLLLLLH | LFLHLHLH | HHLLLLLH | FHLLLLLH |
| 32- | 35 | FFLLLLLF | LFFLLLLH | LFFLHFFH | LLLLLLLH |
| 36- | 39 | LHHLLLLH | LHLLLLLH | LHLLLLLH | HHLLLLLH |
| 40- | 43 | HHLLLLLH | LHHLLLLH | LLLLLLLH | LHHLLLLH |
| 44- | 47 | FFLLLLLF | LLLLLLLH | LHLLLLHL | HFLFFPLH |
| 48- | 51 | LHHLLLLH | HHLHLLHH | LLLLLLLH | LLLLLLLH |
| 52- | 55 | LLLLLLLH | LLLLLLLH | LLLLLLLH | LLLLLLLH |
| 56- | 59 | LLLFHLFH | LLLHHLHH | LHLLLLLH | LFHLLLLH |
| 60- | 63 | LLLLLLLH | LHLLHHL | LHLLLHLL | LHLLLLLH |
| 64- | 67 | HHLLLLLH | HHLLLLLH | LHLLLLLH | LHLLLLLH |
| 68- | 71 | FHLLLLLH | LHLHHLHL | HHLLLLLH | LLLLLLLH |
| 72- | 75 | FFLLLLLF | LHLLLLLH | FHLLLLLH | LHLLLLLH |
| 76- | 79 | HHLLLLLH | LHLLLLLH | HHLLLLLH | LHLLLLLH |
| 80- | 83 | LHLLLLLL | HHLLLLLH | LLLLLLLH | LHLLLLLH |
| 84- | 87 | LHFHLLLH | FHLLLLLH | FHHLLLLH | FHLLLLLH |
| 88- | 91 | HHLHLLHH | HHLLLLLH | LHLLLLLH | FHLLLLLH |
| 92- | 95 | LLLLLLLH | HHLLLLLH | LHLLLHL | HHLLLLLH |
| 96- | 99 | HHLHHLHH | FFHLLLLH | LHLLLFFH | FFHLLLLH |
| 100- | 103 | HFLLLLLH | HHHLLLLH | LHHLLLLH | LFHLLLLH |
| 104- | 107 | FHHLLLLH | LHLLHHLL | HHHLLLLH | LHHLLLLH |
| 108- | 111 | LFLFHLFL | LHLLLLLH | LHLHHLLL | LHLHFLLL |
| 112- | 115 | FFLLLLLH | FHLLLLLH | LHLLLLLH | HHLLLLLH |
| 116- | 119 | LHLLLLLH | HHLLLLLH | LHLHLLLH | FHLHLLLF |
| 120- | 123 | LHLLLLLH | HHLLLLLH | HHLLLLLH | HHLLLLLH |
| 124- | 127 | FFLLLLLH | FHLLLLLH | LLLLLLLH | LLLLLLLH |
| 128- | 131 | LHHLLLLH | FHHLLLLH | HHLLLLLH | LHLLLLLH |
| 132- | 135 | LLLLLLLH | LHLLLLLH | HHLLLLLH | HFHLLLLH |
| 136- | 139 | FFHLLLLH | LLLLLLLH | LFHLLLLH | LHLLLLLH |
| 140- | 143 | HHLLLLLH | LLLLLLLH | HHLHLLFH | LLLLLLLH |
| 144- | 147 | LLLLLLLH | LLLLLLLH | HHLHLLFH | HHHLLLLH |
| 148- | 151 | LLLLLLLH | LHLLLLLH | FHLHLLFH | LLLLLLHL |
| 152- | 155 | LHHLLLLH | LHLLLLLH | LHLLLLLH | LLLLLLLH |
| 156- | 159 | LLLLLLLH | HHHLLLLH | HHLLLLLH | LHLLLLLH |
| 160- | 163 | LLLLLLLH | LLLLLLLH | LLLHHLHH | LLLFHLHH |
| 164- | 167 | LFLLLLLF | LLLFFLFH | LLLFFLFH | LLLHFLHH |
| 168- | 171 | LHLLLLLH | LHLLHHLH | LLLLLLLH | LLLLLLLH |
| 172- | 175 | LFLLLLLH | LLLLLLLH | LHLLLLLH | LHLLLHL |
| 176- | 179 | LHLLLLLH | LFLHLLHH | LLLHLFH | HHLLLLLH |
| 180- | 183 | FHHLLLLH | LLLLLLLH | FHLLLLHL | LFLLLLFH |
| 184- | 187 | HHLLLLLH | FFHLLLLH | HHLLLLLH | LLLHLFHL |
| 188- | 191 | LLLLLLLH | LLLLLLLH | LHLLLLHL | HHLHLLHH |
| 192- | 195 | FHLLLLLH | LHLHFHLH | LHLLLLLH | LHLLLLLH |
| 196- | 199 | LHLLLLLH | LHLLLLLH | HHLHLLFH | LHLLLLLH |
| 200- | 203 | LHLLLLLF | LHLLLLLH | HHLHLLFH | LHLHLLHH |
| 204- | 207 | FHLLLLLF | LHLLHHLH | LLLLLLLH | LHLLLHL |
| 208- | 211 | LHLLLLLH | LHLLHLHL | LHLLLLLH | LFLLFLFH |
| 212- | 215 | FFLHLLHH | HHLFLLHH | LHLHLLLL | HHLLLLLH |
| 216- | 219 | FHLLLLLH | LFHLLHLH | LFHLLHLH | LLLLLLLH |
| 220- | 223 | LHLLLLLH | LLLLLLLH | LHLLLLHL | LLLLLLLH |
| 224- | 227 | HHLLLLLH | LHLLLLLH | LLLLLLLH | HHLLLLLH |
| 228- | 231 | FHLLLLLH | LLLLLLLH | FHLLLLLH | LLLLLLLH |
| 232- | 235 | HHLLLLLH | LLLLLLLH | FHLLLLLH | LLLLLLLH |
| 236- | 239 | HHHHLLHL | LHLHLHLH | LHLLLLLH | HHLHLLHH |
| 240- | 243 | FHLLLLLH | HHHLLLLH | FFHLLLLH | LLLLLLLH |
| 244- | 247 | LLLLLLLH | HHLLLLLH | FFHLLLLH | FFHLLLLH |
| 248- | 251 | LLLLLLLH | LLLLLLLH | FHLLLLLH | LHLLLLLH |
| 252- | 255 | FHHLLLLH | HHHLLLLH | LHLLLLLH | LHLLLLLH |

TABLE IV (7)    WORD PATTERN

| STATE | COL. 1 | COL. 2 | COL. 3 | COL. 4 |
|---|---|---|---|---|
| | 87654321 | 87654321 | 87654321 | 87654321 |
| 0- 3 | PPLLHLHL | HHLLLLLH | LHLLLLLL | LFHHLHLL |
| 4- 7 | LFLLFLLL | HLFLFLHH | PHLLLLLH | FFHHFFFH |
| 8- 11 | LHLLLLHH | LHLLHLHH | LHLHLHHH | HHLLLLLL |
| 12- 15 | PPLLLLLL | LFFHLHHH | HHLLLLHH | HHLLLLLH |
| 16- 19 | FFHLLFFH | FFHLLFHH | FFHLHLLL | PHLLFFHH |
| 20- 23 | PHHHLHHL | HHHHLHHL | LFFHLLFH | LHHLFLHL |
| 24- 27 | HHLHLHLH | HLHHLLHL | HHLLLHHH | LHLLHLLL |
| 28- 31 | HPLLLLLH | LHLHLFHL | FHFFLLFH | FHLLHLLL |
| 32- 35 | HPLHLHLL | HHLLHLLL | LHLLLLLL | FHLLLLLH |
| 36- 39 | PHLLLLLL | HHLLLLLL | HHLLLLLL | PHLLPLHL |
| 40- 43 | HFLHLHLL | HHLLFLHL | FHLLLLLH | PHHLLLHH |
| 44- 47 | HHLLHHLL | HHLLLLLH | PHLLFLFH | LFHLFFLH |
| 48- 51 | HHLLHHLL | LHLLHLLL | HHLLLLLH | FHLLLLLH |
| 52- 55 | PHLLLLLH | HHLLLLLH | HHLLLLLH | HHLLLLLH |
| 56- 59 | FLLLLLLF | FLLLLLLH | FFHLLLFH | HHLLLLLH |
| 60- 63 | HHLLLLLH | HHHLLHLH | HHLFHLHH | HHLLLLLH |
| 64- 67 | PHPFHHLL | HHLLHHHL | HHFHHHLL | HHFHFHLH |
| 68- 71 | FFFHFFFH | FFHLFFFH | FFHLLFFH | FFHLLFHH |
| 72- 75 | HHLLHLLH | HHHLHLHL | FHHLPHHL | FHHLFHLH |
| 76- 79 | HHLLLLHL | HHHLLLLH | HHHLLLHL | HHHLLLHL |
| 80- 83 | HHLHLHLL | FFFHFFLL | FFFLLHLL | LFHLFHHL |
| 84- 87 | HLLLLLLH | HFFHHHHH | HHLHLHHL | PFHLLHLL |
| 88- 91 | LHLLHLLL | HHHLLLHL | HHLLLLLH | HFHLFHLH |
| 92- 95 | PPLLLLLH | HHLLLLHH | HHLHLHHH | HFHLLLLH |
| 96- 99 | LHLLLLLL | FFLFHLLL | HLLLLLLL | FHLHFLLL |
| 100- 103 | FHLLLLLL | HHLHHLLH | HHLLLLLL | HHLLLLLL |
| 104- 107 | FFLHHLLH | HFFHLLLL | HHLLLLHL | HHLLLLLL |
| 108- 111 | FFFHLFFH | FLLPHLHH | LHLFFLFH | LFLHFLFH |
| 112- 115 | HFHHLLLH | HHHHLLLH | HHLLLLHH | HHLLLLHL |
| 116- 119 | HHLLHLHH | HHLLLLHL | LHLHLHHH | LHLLLLHL |
| 120- 123 | PFFHLFFH | FHLLLLHH | FHLLLHHL | HHLLLFHH |
| 124- 127 | HHLLHLLH | HHLLHLHH | HHLLLLLH | HHLLLLLH |
| 128- 131 | HHLLLLLL | HHHLLLLL | HHHHHHLH | HHFHFHHL |
| 132- 135 | PHHLLLLH | HHLLLLLL | FFFFFHLH | HHLLLLLL |
| 136- 139 | HHLLLLLL | HHHLLLHH | HHLLLLLL | FFFHFHHL |
| 140- 143 | HHLLLLLL | HHHLLLHH | LHLLHLLL | HHLLLLLH |
| 144- 147 | HPHLLHLL | HHHLLHLL | LHLLHLLL | HHLHHLLH |
| 148- 151 | FFHLLFLH | FFPLLHLH | LHLLHLLL | FFHLLHLH |
| 152- 155 | FPHHHLLH | HHHHHLHL | HHHFHLLH | FFFHHLHL |
| 156- 159 | HHHLLHHH | HHLFHLLH | HHLHHLLH | FHLLLLLH |
| 160- 163 | FFLLLLLH | PHLLLLLH | LHLLLLH | LLLLLLLH |
| 164- 167 | HHHHHFHL | LHLLLLLH | LHLLLLLH | LHLLLLLH |
| 168- 171 | HHHLHLHL | LHLLLLLH | HHLLLLLH | FHHLHHLL |
| 172- 175 | HFLLLLLL | FFHLFLHL | FHLLLLLH | PFFLFLHH |
| 176- 179 | LHLLLLLL | LHHHLHLH | HLHLHHLL | HPLLHLLL |
| 180- 183 | PHLHHLLH | HHHLFHHL | LHHLHHLH | LHLLLLLH |
| 184- 187 | PFLFHLLF | FFLHHLLH | PHLLHLLL | LFHLFHHL |
| 188- 191 | FFFHLFLH | FFHHLHLH | FHHLHHHH | LHLLHLLL |
| 192- 195 | HHLLHLHH | LHHLHLH | HHLLLLLL | PHLLLLLL |
| 196- 199 | HFHPLLLF | HFHHLLLH | LHLLHLLL | HHHHLLHL |
| 200- 203 | FFFHLLHL | FLFHLLFL | LLLLHLLL | LFFHLLHL |
| 204- 207 | HHLHLHLH | HLHHLLFH | HHHLHLLL | HFFHLLFH |
| 208- 211 | FHLLLLLL | LHHHLHLL | HHLLLLLL | HLLLLLLH |
| 212- 215 | LFLLHLLL | LFLLFLLL | FFFHLHLH | FHLHHLLL |
| 216- 219 | HFHHLHHL | HHHLHHHH | HHLLHHHH | PHLLLLLH |
| 220- 223 | HHHHLFHL | HHLLLLLH | HHHHLHHH | PHLLLLLH |
| 224- 227 | FFFHHLLL | FFFHHLLL | FFFHLLLL | FFHHFLHH |
| 228- 231 | PHHLLHHL | PFFHHLHH | FFHLLHHL | FFFHFLHH |
| 232- 235 | HHHLLHHL | HHHHHLHH | HHHLLHHL | FFFHFLHH |
| 236- 239 | HFFHHLLL | LFFHHLHH | FFFHHLHH | LFLLFLLL |
| 240- 243 | FFLLFLLL | FFLFFLLL | FHLFHLLL | FFFFFLLH |
| 244- 247 | HHHHHHLH | HHLFHLLL | HFFLLLLL | FFHLLLLL |
| 248- 251 | FFFFFFHL | FFFHHHL | HHHLLLLL | HHLLLLLH |
| 252- 255 | FFLFHLLL | FFLFFLLL | FFHLFHLL | HFFFFHLL |

TABLE IV (8)  WORD PATTERN

| STATE | COL. 1 | COL. 2 | COL. 3 | COL. 4 |
|---|---|---|---|---|
| | 87654321 | 87654321 | 87654321 | 87654321 |
| 0- 3 | LLLLFFFH | FFLLFFFH | LFFFFFFF | LHLLFFHH |
| 4- 7 | HLLLHFFH | FHLLHHHH | LHLLHFFH | HLLLFFFH |
| 8- 11 | HLLLHFHH | HLLLFHHH | HLLLHHFH | LLLLFLLH |
| 12- 15 | LLLLHLLF | FLLLFFFH | FLFFFFFH | LLLLFFHH |
| 16- 19 | FHLLHFFH | HHLLHFFH | LLLLFFFH | FHLLFFFH |
| 20- 23 | LLLLHFFH | HLLLHHHH | LHLLHHFH | LLLLFFHH |
| 24- 27 | LLLLHFFH | FHLLHFHH | LLLLFFFH | HLLLFFHH |
| 28- 31 | LLLLHFFH | HLLLHHHH | LLLLFFFH | LHLLFFFH |
| 32- 35 | LLLLFFHH | HHLLFHHH | LLLLHLH | LLLLFFFH |
| 36- 39 | HLLLFFHH | LLLLFHHH | LLLLFHHH | LHLLFFFH |
| 40- 43 | LLLLFFFF | HLLLFFFH | LLLLFFFH | FHLLFFFH |
| 44- 47 | LLLLHFFH | LLLLFHHH | HLLHHHH | HLLLFFFH |
| 48- 51 | HLLLFFFF | HLLLHHHH | LLLLHHFH | LLLLFFHH |
| 52- 55 | LLLLFFFH | LLLLFFFH | LLLLFFFH | LLLLFFHH |
| 56- 59 | LLLLHFHH | LLLLFHFH | LHLLFHFH | LLLLFFFH |
| 60- 63 | LLLLHFHH | HLLLFHHH | LHHLFHFH | LLLLFFFH |
| 64- 67 | HLLLFFHH | HFLLHHHH | FHLLFFFH | LLLLFFHH |
| 68- 71 | LHLLHFHH | LLLFHHH | LHLLHFFH | LLLLFFFH |
| 72- 75 | LLLLFHHH | FHLLHHHH | LHLLHHHH | LHLLFFHH |
| 76- 79 | FHLLFHFH | LLLLFFFH | LLLLHHFH | LHLLFFHH |
| 80- 83 | FLHHFFFH | LFLLFHHH | LLLHFFH | FHLLFFFH |
| 84- 87 | LLLLHFHH | LLLLFHHH | LLLLHFFH | HHLLFFFH |
| 88- 91 | HLLLFHHH | HLLLHHHH | LLLLHHHH | LLLLFFHH |
| 92- 95 | LLLLFFFH | LLLLFFFH | FLLLFFFH | FHLLFFHH |
| 96- 99 | LLLLLLHH | LLLLFFHH | LLLLLFFH | HLLLFFHH |
| 100- 103 | LLLLLHHH | LLLLFHHH | HLLLFHHH | LLLLFLLH |
| 104- 107 | FHLLFFFH | LLLHFFHH | LLLLHLLH | LLLLFLLH |
| 108- 111 | LHLLHHHH | HHLLHHHH | LLHLHHFH | LLLHFFHH |
| 112- 115 | LLLLHFHH | HHLLHHHH | HLLLHHHH | LLLLFFHH |
| 116- 119 | HLLLHHFF | LHLLFHHH | HLLLHFFH | HLLLFFHH |
| 120- 123 | FLLLFFFH | LHLLHHHH | HLLLHHHH | FHLLFFFH |
| 124- 127 | HHLLHFHH | LLLLHHHH | LLLLHHHH | LLLLFFFH |
| 128- 131 | LLLLHLHH | LLLLFHHH | HHLLFHHH | LLLLFFHH |
| 132- 135 | LFLLFFFH | LLLLFLLH | FLLLFFFH | LLLLHLLH |
| 136- 139 | LLLLHLLH | LLLLHFHH | FLLLFHHH | LHLLFFHH |
| 140- 143 | LLLLHLLH | HLLLHHHH | HLLLHHHH | LLLLFFHH |
| 144- 147 | LFLLFFFH | FLLLFFFH | FLLLFFFH | LLLLFFHH |
| 148- 151 | HLLLHHHH | FHLLHHHH | HLLLHFFH | LFHLFFFH |
| 152- 155 | LHLLHFHH | LHLLHHHH | HHLLHHHH | HHLLFFHH |
| 156- 159 | HLLLHHHH | LLLLFFFH | LLLLFFFH | LLLLFFHH |
| 160- 163 | LLLLHFFH | LLLLHHHH | LLLLFFFH | LLLLFFFH |
| 164- 167 | HHLLHHHH | LLLLHHHH | LLLLHFFH | LLLLFFFH |
| 168- 171 | LHLLFHHH | HLLLFHHH | LLLLHHFH | LLLLFFHH |
| 172- 175 | LLLLFFFH | HLLLFFFH | LHLLHHHH | HLLHFFHH |
| 176- 179 | HLLLHFHH | LLLLHHHH | HHLLHHHH | LLLLFFFH |
| 180- 183 | FHLLFFFH | LLLLFFHH | HLFFHFHH | LLLLFFFH |
| 184- 187 | FHLLFFFF | FHLLFFFH | LLLLFFFH | HFFLFFFH |
| 188- 191 | FHLLHFFH | HHLLHHHH | HLFFFFFH | HLLLFFFH |
| 192- 195 | HHLLHHHH | LHLLHHHH | LLLLHHHH | LLLLFFFH |
| 196- 199 | LFLLFFFH | HLLLFHHH | FLLLFFFH | LLLLFFHH |
| 200- 203 | LHLLHFFH | HLLLHHHH | FLLLFFFH | HHLLFFFH |
| 204- 207 | HLLLFHHH | HHLLHHHH | LHLLHHFH | LHHLFFHH |
| 208- 211 | FLLLFFFH | LFHHFHFH | LLLLFFFH | LLLLFFHH |
| 212- 215 | HLLLHFHH | HLLLHFHH | LLLFFFHH | HLLLFFFH |
| 216- 219 | LHLLFHHH | HLLLHHHH | HLLLHHFH | LLLLFFHH |
| 220- 223 | FFLLFFFH | LLLLFHHH | HLFHHHHH | LLLLFFHH |
| 224- 227 | LFLLFFFH | FLLLFFFH | FFLLHHFH | HLLLFFHH |
| 228- 231 | LLLLFFHH | HLLLHHHH | HLLLHHHH | HLLLFFHH |
| 232- 235 | LFLLHHHH | HLLLFHHH | HHLLHHHH | HLLLFFHH |
| 236- 239 | LFFFFFFH | HLLLFHFH | FLLLFFFH | FLLLFFHH |
| 240- 243 | LLLLHFHH | LLLLHHHH | LLLLFFFH | LHLLFFHH |
| 244- 247 | LFLLHFFH | LLLLFFHH | LLLHHHH | LLLLFFHH |
| 248- 251 | HLLLFHHH | FLLLFFHH | LLLLFFFH | LLLLFFHH |
| 252- 255 | HLLLFFFH | HLLLFFHH | HLLLHFFH | LLLLFFHH |

While all of the states in the control ROM 14 have been depicted in Table IV above, only a relatively small number are involved in carrying out the operations illustrated by the flow diagrams of FIGS. 7–9.

More particularly, as shown in FIG. 6, four bit lines 14a lead from ROM 14 to A multiplexer 46. Lines 14a thus apply the first four bits in each of the 256 control words in ROM 14 to A multiplexer 46. Three of the lines 14a are decoded in A multiplexer 46 to address a selected one of the eight inputs to the multiplexer. Multiplexer 46, in the embodiment here described, comprises a set of 16 eight input multiplexer units of the type manufactured and sold by Texas Instruments Incorporated, Dallas, Texas and identified as Data Selectors/Multiplexers SN74151A. Each such unit is provided with decoding logic to select one of eight inputs. The fourth of the lines 14a is an inhibit line. When the fourth line is in state to inhibit multiplexer 46, all of the 16 output lines are low or zero.

In a similar manner, three lines 14b extend to B multiplexer 53. Two of lines 14b are used to address the four inputs to B multiplexer 53. The third line is an inhibit line. B multiplexer 53 comprises a set of 16 four input multiplexer units manufactured and sold by Texas Instruments Incorporated and identified as Data Selectors/Multiplexers SN74153N.

From Table V the use of the control states stored in ROM 14 is specified. In Table V all ROM 14 data is shown true. However, in Table IV bits 1–4, 11, 18, 21, 22, 25, 27–29, 35, 36, 40, 42, 48, 49, 50 and 61–64 are noted in complemented states. Thus, references between Tables IV and V must take into account this difference in rotation.

TABLE V

| BITS | 1 | 2 | 3 | 4 | | MULTIPLEXER A | |
|---|---|---|---|---|---|---|---|
| | 0 | 0 | 0 | 0 | (MEM) | A Multiplexer | Memory Input Enabled |
| | 0 | 0 | 1 | 0 | (REU) | " | Memory Input Enabled (Reverse) |
| | 0 | 1 | 0 | 0 | (ST) | " | Status Input Enabled |
| | 0 | 1 | 1 | 0 | (EMUX) | " | E Multiplexer Input Enabled |
| | 1 | 0 | 0 | 0 | (WA) | " | WA Input Enabled |
| | 1 | 0 | 1 | 0 | (DMUX) | " | D Multiplexer Input Enabled |
| | 1 | 1 | 0 | 0 | (URA) | " | Utility Register A Input Enabled |
| | 1 | 1 | 1 | 0 | (SDX2) | " | SDX2 Input Enabled |
| | 0 | 0 | 0 | 1 | (ZERO) | " | Outputs All Zero |
| | X | X | X | 0 | (INHLSA) | " | Inhibited |
| | 0 | 1 | 0 | 1 | (X'02') | " | X'02' Output Generated |
| | 1 | 0 | 0 | 1 | (X'18') | " | X'18' Output Generated |
| | 1 | 1 | 0 | 1 | (X'1A') | " | X'1A' Output Generated |
| | 0 | 0 | 1 | 1 | (X'16') | " | X'16' Output Generated |

| BITS | 5 | 6 | 7 | | MULTIPLEXER B | |
|---|---|---|---|---|---|---|
| | 0 | 0 | 0 | (WP) | B Multiplexer | Workspace Pointer Input Enabled |
| | 0 | 1 | 0 | (URB) | " | Utility Register B Input Enabled |
| | 1 | 0 | 0 | (MD) | " | Memory Data Input Enabled |
| | 1 | 1 | 0 | (PC) | " | Program Counter Input Enabled |
| | 0 | X | 1 | (ZERO) | " | Force All Outputs to Zero |
| | X | X | 0 | (INHMSB) | " | Inhibit Most Significant Bit |
| | 1 | X | 1 | (X'02') | " | Enable Generation of X'02' |

| BIT | 8 | | | |
|---|---|---|---|---|
| | 0 | (DX2) | Multiplexer D | - DX2 Input Enabled |
| | 1 | (SX2) | " | " - SX2 Input Enabled |
| | 0 | (DX4)+X'40' | " | E - (DX4)+X'40' Input Enabled |
| | 1 | TRAP | " | " - TRAP Input Enabled |

BIT 9 (ENCMDREV) Enable Memory Data Reverse
BIT 10 (ENAREV) Enable Reverse
BIT 11 (INHMSBLSA) Inhibit Most Significant Bit of LSA
BIT 12 (ENALUBYTE) Enable ALU Byte
BIT 13 ALU to M Input Line
BIT 14 ALU to S3 Input Line
BIT 15 ALU to S2 Input Line
BIT 16 ALU to S1 Input Line
BIT 17 ALU to S0 Input Line
BIT 18 ALU Carry In Enabled
BIT 19 (ENWPLD) WP Register 40 Load Enabled
BIT 20 (ENMDLD) Memory Data Register Load Enabled

| BITS | 21 | 22 | UTILITY REGISTER A |
|---|---|---|---|
| | 0 | 0 | |
| | 0 | 1 | Utility Register A Left Shift Enabled |
| | 1 | 0 | Utility Register A Right Shift Enabled |
| | 1 | 1 | Utility Register A Load Enabled |

| BITS | 23 | 24 | UTILITY REGISTER B |
|---|---|---|---|
| | 0 | 0 | |
| | 0 | 1 | Utility Register B Left Shift Enabled |
| | 1 | 0 | Utility Register B Right Shift Enabled |
| | 1 | 1 | Utility Register B Load Enabled |

TABLE V-continued

| | | | | |
|---|---|---|---|---|
| BIT 25 (ENCRUFF) | | | CRU 24 Flip-Flop Enabled | |
| BIT 26 (ENSCINC) | | | Enable Shift Counter Increment | |
| BIT 27 (ENPCLD) | | | Program Counter 42 Load Enabled | |
| BIT 28 (ENPCINC) | | | Program Counter 42 Increment Enabled | |
| BIT 29 (ENADCLD) | | | Memory Register 56 Load Enabled | |
| BIT 30 (ENADCINC) | | | Memory Register 56 Increment Enabled | |

| BITS | 31 | 32 | 33 | 34 | STATUS REGISTER |
|---|---|---|---|---|---|
| | 0 | 0 | 0 | 0 | |
| | 0 | 0 | 0 | 1 | Status Register Load Enabled |
| | 0 | 0 | 1 | 0 | Enable Map File Register Store |
| | 0 | 0 | 1 | 1 | Enable Automatic Masking |
| | 0 | 1 | 0 | 0 | Enable Mask Field Clear |
| | 0 | 1 | 0 | 1 | Enable Status Test No. 1 |
| | 0 | 1 | 1 | 0 | Enable Status Test No. 2 |
| | 0 | 1 | 1 | 1 | Enable Odd Parity if IR03 = 1 |
| | 1 | 0 | 0 | 0 | Enable Arithmetic and Logical Compare Test |
| | 1 | 0 | 0 | 1 | Enable Status Test No. 3 |
| | 1 | 0 | 1 | 0 | Enable Corresponding Zeros and Ones Test |
| | 1 | 0 | 1 | 1 | Enable Zero Compare |
| | 1 | 1 | 0 | 0 | Enable 120 Hz. Clock Flip-flop |
| | 1 | 1 | 0 | 1 | Enable Status Test No. 4 |
| | 1 | 1 | 1 | 0 | Enable Shift Carry Test |
| | 1 | 1 | 1 | 1 | Enable XOP Indicator Set |

BIT 35 - Enable CRU
BIT 36 - (Unused)

| BITS | 37 | 38 | 39 | UTILITY REGISTER 13 SHIFT INPUT SELECT |
|---|---|---|---|---|
| | 0 | 0 | 0 | URB 15 → URB0 |
| | 0 | 0 | 1 | CR BIT IN |
| | 0 | 1 | 0 | URA 15 |
| | 0 | 1 | 1 | URB 00 |
| | 1 | 0 | 0 | 0 |
| | 1 | 0 | 1 | 1 |
| | 1 | 1 | 0 | CRUOUT |
| | 1 | 1 | 1 | IR07 |

BIT 40 - (Unused)
BIT 41 Enable Fetch
BIT 42 Enable Store
BIT 43 Enable Delay

| BITS | 44 | 45 | 46 | 47 | 48 | 49 | 50 | DECISION & SPECIAL CONTROL |
|---|---|---|---|---|---|---|---|---|
| | 1 | 0 | 0 | 1 | 0 | 1 | 0 | Enable End of Instruction (EOI) |
| | 0 | 0 | 0 | 0 | 1 | 0 | 0 | RESTART |

BITS 51 - 58   J0
BITS 59 - 60   J1
BITS 61 - 63   NRA
64 - (Unused)

From Table V it will be seen that ROM 14 bits 1–3 are decoded in A multiplexer 46 to address its eight inputs. The ROM bits 1–4 are employed in combination to provide 14 functions, including controls for generating the indexing conditions employed for locating the workspace pointer, the program counter and the status register at the desired last three elements of the workspace.

Bits 5, 6 and 7 are employed by B multiplexer 53 to address the four inputs thereto, the first two control inputs of B multiplexer 46 being decoded and the third an inhibit line.

By way of relating the contents thus far described of Table V to the contents of Table IV and to the flow diagram of FIGS. 7–9, note the following: In FIG. 7, state 00 requires A multiplexer 46 to address E multiplexer 46a. In Table V it will be noted that A multiplexer 46 enables the E multiplexer input when the first four bits have the states 0110. In Table IV, the ROM bits 1–4 are the first four bits found at the top of column 1. Their states are designated by the legend HLLH, i.e., high, low, low, high. Since as above indicated, the first four ROM bits in Table IV are shown completed, the legend HLLH thus corresponds with the complement of 0110. Thus, for every function indicated in the flow diagrams of FIGS. 7–9, Table V gives the state and the element affected. From Table V the key to the precise bits in ROM 14 which are utilized for carrying out the function designated in the flow diagrams are specified. Since there are 64 bits to each word in ROM 14, many of which are utilized for various computer functions not mentioned in the flow chart of FIGS. 7–9, their function has been emitted from Table V.

The TILINE bus above described is preferably of the type described and claimed in U.S. Pat. No. 3,886,524 by Daren R. Appelt and entitled Asynchronous Communication Bus, (Attorney Docket No. TI-5289).

Having described the invention in connection with certain specific embodiments thereof, it is to be understood that further modifications may now suggest themselves to those skilled in the art and it is intended to cover such modifications as fall within the scope of the appended claims.

What is claimed is:

1. A digital computer system providing flexibility in the high-speed selection and utilization of a plurality of multielement workspaces in main memory, comprising:
   a. a workspace pointer register to store the address of the first of a set of consecutive memory locations forming workspace in main memory;
   b. a program counter register to store the address of the current program instruction being executed;
   c. a status register to store a current indication of the status of the program being executed;
   d. control memory means to supply a distination code to be added to the contents of the workspace pointer register to form the distination address;

e. an arithmetic logic unit which sums the destination code with the contents of the workspace pointer register;

f. an address register to store the output of the arithmetic logic unit; and g. means to store the address of the first element of a prior workspace at the destination address in response to an interrupt condition.

2. The computer system of claim 1 wherein the storing means further include means for storing the address of the next program instruction of a prior program and the address of an indication of the status of the prior program in a second and third destination address, respectively, in response to an interrupt condition.

3. The computer system of claim 2 further including:

h. return command means, activated upon the conclusion of the interrupt condition, for returning the address of the first element of a prior workspace, the address of the next instruction of the prior program, and the address of an indication of the status of the prior program to the workspace pointer register, the program counter register and the status register, respectively.

* * * * *